US009304559B2

(12) United States Patent
Toda et al.

(10) Patent No.: US 9,304,559 B2
(45) Date of Patent: Apr. 5, 2016

(54) COMMUNICATION DEVICE, CONTROL METHOD FOR COMMUNICATION DEVICE, AND STORAGE MEDIUM

(71) Applicants: Yoshiyuki Toda, Kanagawa (JP); Osamu Ogawara, Kanagawa (JP)

(72) Inventors: Yoshiyuki Toda, Kanagawa (JP); Osamu Ogawara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 351 days.

(21) Appl. No.: 13/730,288

(22) Filed: Dec. 28, 2012

(65) Prior Publication Data

US 2013/0179700 A1    Jul. 11, 2013

(30) Foreign Application Priority Data

Jan. 10, 2012   (JP) ................................ 2012-002346
Sep. 24, 2012   (JP) ................................ 2012-209242

(51) Int. Cl.
*G06F 1/26*      (2006.01)
*G06F 1/32*      (2006.01)

(52) U.S. Cl.
CPC ................ *G06F 1/26* (2013.01); *G06F 1/3287* (2013.01); *Y02B 60/1282* (2013.01)

(58) Field of Classification Search
CPC ...... G06F 1/26; G06F 1/3287; Y02B 60/1282
See application file for complete search history.

(56) References Cited

U.S. PATENT DOCUMENTS

| 6,545,653 | B1* | 4/2003 | Takahara et al. ................. 345/87 |
| 7,541,690 | B2* | 6/2009 | Kobayashi et al. ............. 307/19 |
| 7,707,439 | B2* | 4/2010 | Yanagawa ...................... 713/300 |
| 7,894,085 | B2* | 2/2011 | Maeda ......................... 358/1.13 |
| 8,126,348 | B2* | 2/2012 | Park et al. ....................... 399/75 |

FOREIGN PATENT DOCUMENTS

| CN | 1617069 A    | 5/2005 |
| CN | 1893667 A    | 1/2007 |
| CN | 101566870 A  | 10/2009 |
| JP | 2004-117388  | 4/2004 |
| JP | 2011-035798  | 2/2011 |

OTHER PUBLICATIONS

Combined Office Action and search Report issued Nov. 27, 2014 in Chinese Patent Application No. 201310082146.0 (with English translation).

* cited by examiner

*Primary Examiner* — M Elamin
(74) *Attorney, Agent, or Firm* — Oblon, McClelland, Maier & Neustadt, L.L.P.

(57) ABSTRACT

A communication device includes a main control part configured to receive and process an image signal; a first network control part configured to convert data input from an external device into the image signal and provide the main control part with the image signal; a sub control part configured to detect a power-on command; and a second network control part configured to control communications with the external device via a network to provide the first network control part with data input from the external device. Power supplies to the main control part, the sub control part, the first network control part and the second network control part are independently controlled.

19 Claims, 19 Drawing Sheets

FIG.3

| STATE | | SUB CPU | NETWORK SUB CPU | WIRED NETWORK I/F | WIRELESS NETWORK I/F | MAIN CPU | LAMP/ DMD | FAN | NETWORK CPU |
|---|---|---|---|---|---|---|---|---|---|
| OFF | STEADY | OFF | OFF | OFF | OFF | OFF | OFF | OFF | OFF |
| STAND-BY A (NETWORK OFF) | STEADY | ON | OFF | OFF | OFF | OFF | OFF | OFF | OFF |
| STAND-BY B (WIRED COMMUNICATION ONLY) | STEADY | ON | ON (LOW POWER) | ON | OFF | OFF | OFF | OFF | OFF |
| STAND-BY C (NETWORK ON) | STEADY | ON | ON (LOW POWER) | ON | ON | OFF | OFF | OFF | OFF |
| ACTIVE STAND-BY | STEADY | ON | ON | ON | ON | ON (LOW POWER) | OFF | OFF | ON |
| WARMING UP | TRANSIENT | ON | ON | ON | ON | ON | OFF | ON | ON |
| COOLING DOWN | TRANSIENT | ON | ON | ON | ON | ON | OFF | ON | ON |
| ON | STEADY | ON | ON | ON | ON | ON | ON | ON | ON |

FIG.12

| ENABLE TO DISPLAY INFORMATION? | POWER SUPPLY CONDITION | | |
|---|---|---|---|
| | MAIN CPU | LAMP/DMD | FAN |
| NO | OFF | OFF | OFF |
| NO | OFF | OFF | ON |
| NO | OFF | ON | OFF |
| NO | ON | ON | ON |
| NO (LED ONLY) | ON | OFF | OFF |
| NO (LED ONLY) | ON | OFF | ON |
| YES (PROJECTION + LED) | ON | ON | OFF |
| YES (PROJECTION + LED) | ON | ON | ON |

FIG.13

| INFORMATION OBTAINABLE? | POWER SUPPLY CONDITION | | |
|---|---|---|---|
| | NETWORK SUB CPU | WIRED NETWORK I/F | WIRELESS NETWORK I/F |
| NO | OFF | OFF | OFF |
| NO | OFF | OFF | ON |
| NO | OFF | ON | OFF |
| NO | OFF | ON | ON |
| YES (SETTING ONLY) | ON | OFF | OFF |
| YES (STATE FOR WIRELESS ONLY) | ON | OFF | ON |
| YES (STATE FOR WIRED ONLY) | ON | ON | OFF |
| YES | ON | ON | ON |

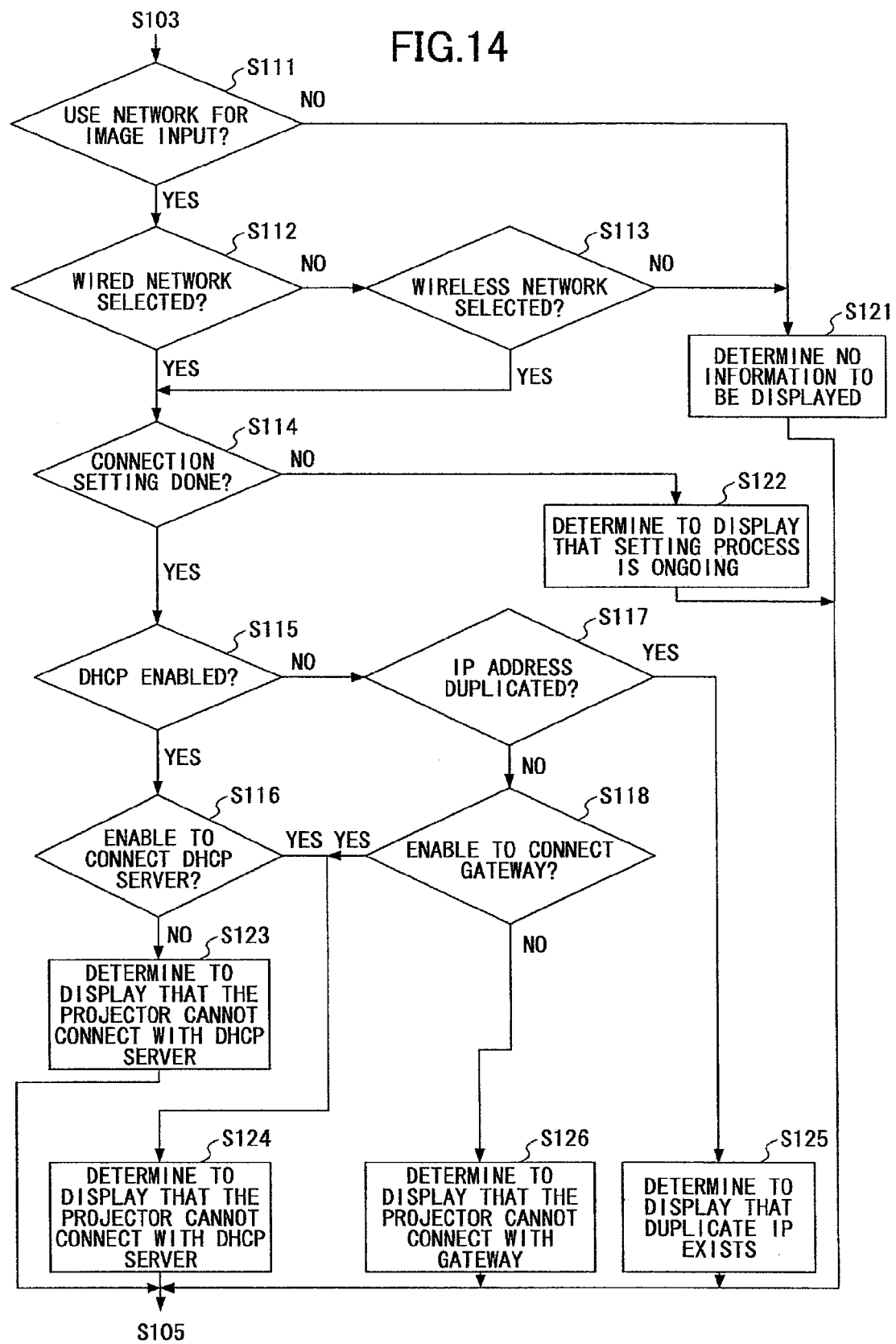

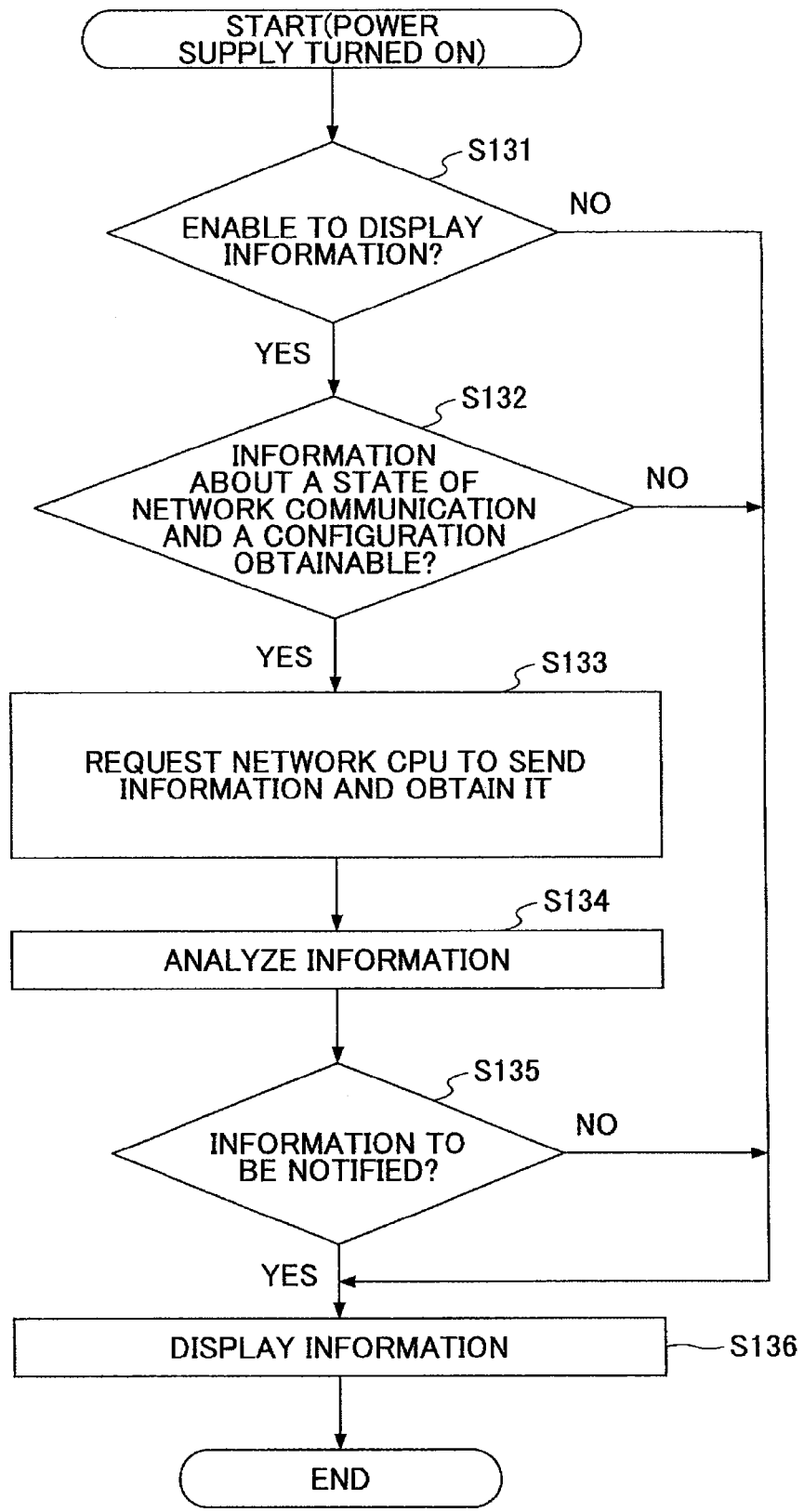

FIG.16

| INFORMATION OBTAINABLE? | POWER SUPPLY CONDITION | | | |
|---|---|---|---|---|
| | NETWORK CPU | NETWORK SUB CPU | WIRED NETWORK I/F | WIRELESS NETWORK I/F |
| NO | OFF | OFF | OFF | OFF |
| NO | OFF | OFF | OFF | ON |
| NO | OFF | OFF | ON | OFF |
| NO | OFF | ON | ON | ON |
| NO | OFF | ON | OFF | OFF |
| NO | OFF | ON | OFF | ON |
| NO | OFF | ON | ON | OFF |
| NO | ON | OFF | OFF | OFF |
| NO | ON | OFF | OFF | ON |
| NO | ON | OFF | ON | OFF |
| YES (SETTING ONLY) | ON | ON | OFF | OFF |
| YES (STATE FOR WIRELESS ONLY) | ON | ON | OFF | ON |
| YES (STATE FOR WIRED ONLY) | ON | ON | ON | OFF |
| YES | ON | ON | ON | ON |

FIG.18

| ENABLE TO DISPLAY INFORMATION? | POWER SUPPLY CONDITION | | |
|---|---|---|---|
| | MAIN CPU | LIQUID CRYSTAL PANEL | SPEAKER |
| NO | OFF | OFF | OFF |
| NO | OFF | OFF | ON |
| NO | OFF | ON | OFF |
| NO | OFF | ON | ON |
| NO (LED ONLY) | ON | OFF | OFF |
| NO (LED AND SOUND ONLY) | ON | OFF | ON |
| YES (DISPLAY + LED) | ON | ON | OFF |
| YES (DISPLAY + SOUND + LED) | ON | ON | ON |

FIG.19

| SOURCE \ TARGET | MAIN CPU | SUB CPU | NETWORK CPU | NETWORK SUB CPU |
|---|---|---|---|---|
| MAIN CPU | × | × | × | × |
| SUB CPU | ○ | × | × | ○ |
| NETWORK CPU | × | × | × | × |
| NETWORK SUB CPU | × | × | ○ | × |

COMMUNICATION DEVICE, CONTROL METHOD FOR COMMUNICATION DEVICE, AND STORAGE MEDIUM

BACKGROUND OF THE INVENTION

1. Field of the Invention

The disclosures herein generally relate to communication devices, methods for controlling communication devices and storage medium for storing a program causing the control part of a communication device to execute a control method.

2. Description of the Related Art

Historically, as disclosed in Japanese Laid-Open Patent Application No. 2011-35798, a projector which can communicate with external devices via a network comprises three microcomputers: an intelligent main microcomputer controlling a graphic processing and optical system driving part; a sub microcomputer, which works in a stand-by state, controlling an input unit and a display unit such as an operating panel and a remote controller receiver and an RS-232C terminal; and a network microcomputer controlling a network.

In the stand-by state in which the projector does not project an image, the main microcomputer and the network microcomputer are generally turned off while only the sub microcomputer is turned on, thereby reducing power consumption.

In addition, Japanese Laid-Open Patent Application No. 2011-35798 discloses the following configuration in order to simplify a system configuration and to decrease power consumption. The disclosure comprises: a main microcomputer and a network microcomputer having functions to control a network, an input unit, and a display unit and further having a fan control function. The network microcomputer controls the power supply to the main microcomputer at the time of transition to a stand-by state or return to a normal state.

In the configuration using three microcomputers, the network microcomputer has to be switched on in order to use a function using network communication in stand-by state (e.g. a projector control function with the PJLink protocol). The problem with this arrangement is that power consumption cannot be reduced sufficiently.

Also on the configuration using two microcomputers, the power of the network microcomputer having various functions needs to be switched on in the stand-by state; this also gives rise to a problem that the power consumption cannot be reduced sufficiently. Such a problem occurs not only in projectors but also in communication devices that have a function to communicate with an external device via a network. That is, the problem occurs when an attempt is made to reduce power consumption in the stand-by state in which the network communication function is enabled while other functions are suspended to an extent possible.

This invention aims to solve that problem and reduce power consumption in the stand-by state in which a network communication function is enabled on a communication device having communication functions with an external device via a network.

SUMMARY OF THE INVENTION

It is a general object of at least one embodiment of the present invention to provide a communication device and a control method for the device that substantially obviates one or more problems caused by the limitations and disadvantages of the related art.

In one embodiment, a communication device includes:
a main control part configured to receive and process an image signal;
a first network control part configured to convert data input from an external device into the image signal and provide the main control part with the image signal;
a sub control part configured to detect a power-on command; and
a second network control part configured to control communication with the external device via a network to provide the first network control part with data input from the external device;
wherein power supplies to the main control part, the sub control part, the first network control part and the second network control part are independently controlled.

In another embodiment, a control method is provided to control a communication device including:
a main control part configured to receive and process an image signal;
a first network control part configured to convert data input from an external device into the image signal and provide the main control part with the image signal;
a sub control part configured to detect a power-on command; and
a second network control part configured to control communication with an external device via a network to provide the first network control part with data input from the external device;
wherein power supplies to the main control part, the sub control part, the first network control part and the second network control part are independently controlled.

The control method includes:
obtaining information about a state of communication with the external device or a configuration for communication with the external device from the second network control part when power supply to the first network control part or main control part is turned on; and
reporting all or part of the information to a user.

In another embodiment, a computer-readable storage medium for storing a program therein is provided. The program causes a communication device including
a main control part configured to receive and process an image signal;
a first network control part configured to convert data input from an external device into the image signal and provide the main control part with the image signal;
a sub control part configured to detect a power-on command; and
a second network control part configured to control communication with an external device via a network to provide the first network control part with data input from the external device;
wherein power supplies to the main control part, the sub control part, the first network control part and the second network control part are independently controlled
to execute a control method.

The control method includes:
obtaining information about a state of communication with the external device or a configuration for communication with the external device from the second network control part when power supply to the first network control part or main control part is turned on; and
reporting all or part of the information to a user.

On a communication device having a function to communicate with an external device via a network, the configuration stated above may enable the network communication function even in a stand-by state and reduce power consumption in the stand-by state.

BRIEF DESCRIPTION OF THE DRAWINGS

Other objects and further features of embodiments may become apparent from the following detailed description when read in conjunction with the accompanying drawings, in which:

FIG. 3 is a table of power supply states prepared in the projector in FIG. 1;

FIG. 12 is exemplary criteria of step S101 in FIG. 11;

FIG. 13 is exemplary criteria of step S102 in FIG. 11;

FIG. 14 is an exemplary analytical procedure of step S104 in FIG. 11;

FIG. 15 is a flowchart of the procedures alternatively performed by the main CPU described in FIG. 11;

FIG. 16 is exemplary criteria of step S132 in FIG. 15;

FIG. 18 is exemplary criteria in the display unit in FIG. 17; and

FIG. 19 is a relationship between controlling CPUs and controlled CPUs on power control.

DESCRIPTION OF THE PREFERRED EMBODIMENTS

In the following, embodiments of the present invention will be described with reference to the accompanying drawings.

Figure 1:
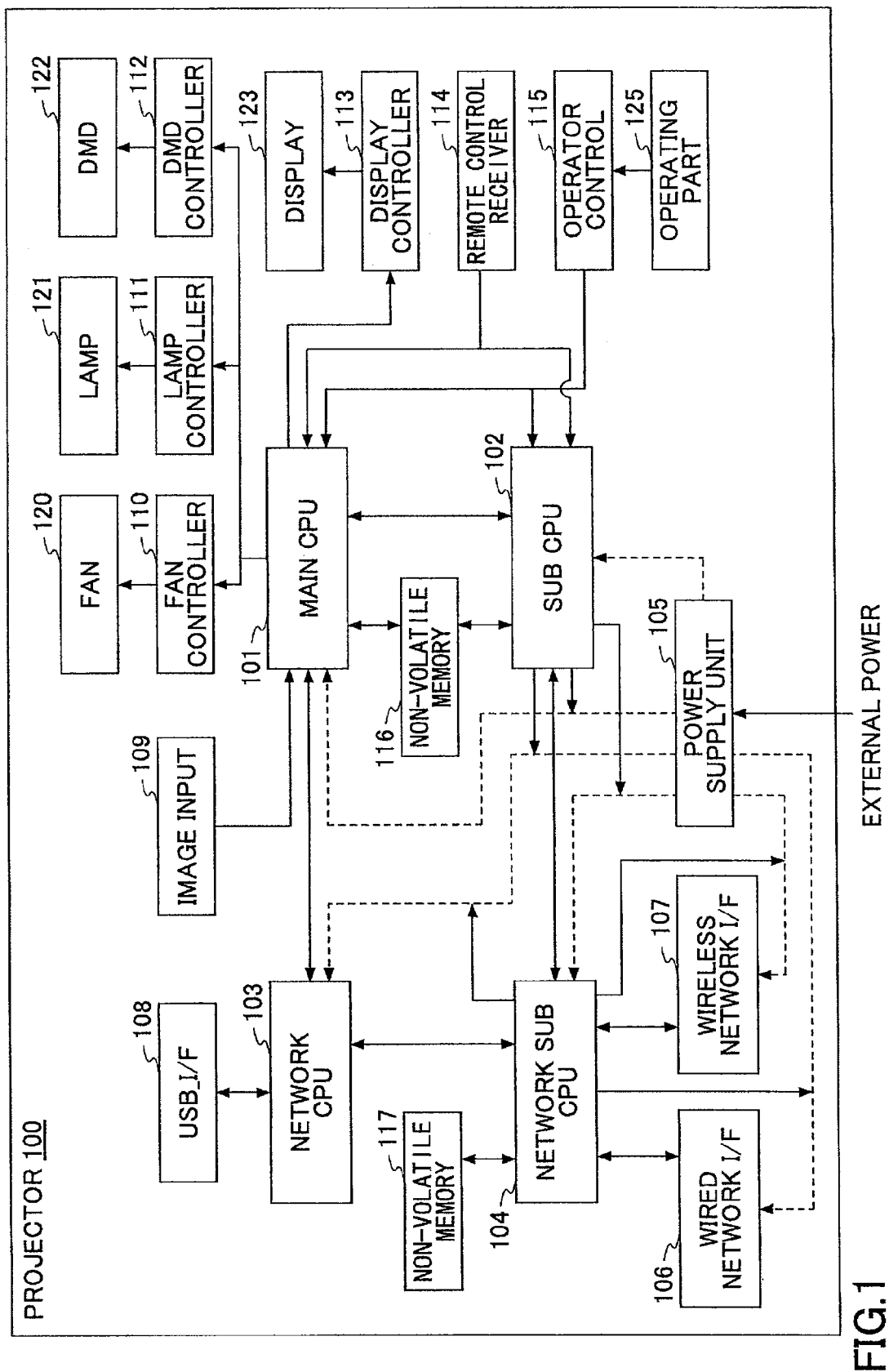
FIG. 1 is a drawing illustrating a hardware configuration of a projector according to an embodiment of the invention.

FIG. 1 shows a hardware configuration of a projector according to an embodiment of the invention.

The projector 100 is a projection apparatus projecting images on a screen based on data or signals of an input image (including video in the present specification, the same below unless it is explicitly stated otherwise). The projector 100 comprises four CPUs: a main CPU 101, a sub CPU 102, a network CPU 103 and a network sub CPU 104. Each of the CPUs executes programs to be required and controls hardware to be required to realize the operations stated below.

The main CPU 101 operates as the main controller, which has a function to control a Digital Mirror Device (DMD) 122 and to project an image based on an image signal input from either an image input 109 or the network CPU 103. A DMD controller 112 directly controls the DMD 122. The main CPU 101 may provide the DMD controller 112 with an image signal to project and configuration data to use for projection to project a required image on the DMD 122.

The main CPU 101 also has a signal processing function to adjust characteristics such as contrast, color or the like. The projection itself may be considered as signal processing. In addition, the main CPU 101 has a function to control a lamp 121 for projection of an image via a lamp controller 111 and a fan 120 for cooling the lamp 121 via a fan controller 110. The main CPU 101 also has a function to control a display 123 comprising a light-emitting diode (LED) lamp, a small liquid crystal panel, etc., via a display controller 113 and to allow the display 123 to show required information.

Furthermore, the main CPU 101 has a function to detect an operation performed on an operating part 125 comprising buttons and switches via an operator control 115 and a signal received by a remote control receiver 114, which indicates an operation on the remote control receiver 114. In addition to the above description, the main CPU 101 may handle other controls which are not handled by the other CPUs. The main CPU 101 with the various functions operates with relatively high power consumption. Thus, in the stand-by state to reduce power consumption, basically the power supply to the main CPU 101 is turned off.

Second, the sub CPU 102 operates as the sub controller, which has a function to detect an operation via the remote control receiver 114 and the operator control 115. The sub CPU 102 also has a function to control on/off state of power supply to the main CPU 101 and a request from the network sub CPU 104 depending on a request from the main CPU 101 and the network sub CPU 104. This will be described hereinafter in more detail.

Because the functions of the sub CPU 102 are substantially limited to these functions, it operates with extremely low power consumption. In order to detect user's operations even in a state that power supply to the main CPU 101 is turned off, power supply to the sub CPU 102 is always kept on while the power is supplied from an external power source to a power supply unit 105.

The network CPU 103 operates as the first network controller. The network CPU 103 has a function to convert projection target data into an image signal so that the form is suitable for use by the main CPU 101, wherein the data is received from an external device via a network and the network sub CPU 104 and is loaded from a USB memory which is an external storage medium connected to a Universal Serial Bus Interface (USB_I/F) 108. Also it has a function to output the transformed signal into the main CPU 101. The workload to perform such procedures is relatively high and thus the network CPU 103 operates with relatively high power consumption.

The network CPU 104 operates as the second network controller. The network CPU 104 has a function to communicate with an external device via a network and pass the projection target data received from the external device to the network CPU 103. The projector 100 comprises a wired network interface 106 for wired communication and a wireless network interface 107 for wireless communication. The former is an interface for communication using Ethernet, and the latter is an interface for communicating using Institute of Electrical and Electronics Engineers (IEEE) 802.11b/11a/11g/11n. The network sub CPU 104 may communicate with the external device via a network using both of or either of them.

In addition, the network sub CPU 104 has a function to control on/off state of power supply to the wired network interface 106 and the wireless network interface 107 depending on an interface setting for use of communication. Furthermore, the network sub CPU 104 operates as a supply control part and controls on/off state of power supply to the network CPU 103 depending on detection of an event indicating transition from stand-by state to power on state or an event conversely indicating from the power on state to stand-by state. This is described below in more detail. Here, FIG. 19 shows a relationship between controlling CPUs and controlled CPUs on power control. In the table described in FIG. 19, the controlling CPUs are listed on the left side of the table and the controlled CPUs are on the upper side. For example, "main CPU" does not control any CPU power. On the other hand, "sub CPU" may control the "main CPU" and "network sub CPU". In an embodiment of the invention, as described in FIG. 19, an example is described where the "sub CPU" and the "network sub CPU" control power of other CPUs. However, in another embodiment of the invention, the "sub CPU" and "network sub CPU" may control other CPUs unlike in FIG. 19. Alternatively, either "main CPU" or "network CPU" may control power of other CPUs in another embodiment of the invention.

A power supply unit 105 has a function to provide power from an external power source such as a home use electric power supply connected by power cable with each part of the projector 100. In FIG. 1, power lines for the main CPU 101, the sub CPU 102, the network CPU 103, the network sub CPU 104, the wired network interface 106 and the wireless network interface 107, which are main targets for power supply, are described by dashed lines. The on/off state of power supplies to at least these parts may be changed individually. In addition, the power supply unit 105 provides power to other parts which are not illustrated.

Arrows toward the power line indicate that the on/off state of power supply though the power line may be controlled. The sub CPU 102 may control on/off state of power supplies to the main CPU 101, the network CPU 103 and the network sub CPU 104. The network sub CPU 104 may control on/off state of power supplies to the network CPU 103, the wired network interface 106 and the wireless network interface 107.

The main CPU 101 and network CPU 103 may send a predetermined signal to the power supply unit 105 to cut off power lines for themselves and turn off the power supply (not shown). In this embodiment, the network sub CPU 104 does not turn off the power supply to the network CPU 103 directly, but requests it to turn off the power supply to itself. Much the same is true for the power supply to the main CPU 101 controlled by the sub CPU 102. On other parts not described above, a USB_I/F 108 is an interface to connect an external device according to a USB standard.

An image input 109 has a function to receive input of image signals from an external device according to a suitable standard such as Digital Visual Interface Integrated (DVI-I), Video Graphics Array (VGA), RS-232C, etc. A non-volatile memory 116 is a non-volatile memory part which both the main CPU 101 and sub CPU 102 may access. For instance, it may be Electrically Erasable Programmable Read-Only Memory (EEPROM). The non-volatile memory 116 stores an operation log, configuration information, etc. The configuration information may include the energy saving setting and the power on setting. The information of the configuration may also include interface settings for use of communications, a Dynamic Host Configuration Protocol (DHCP) server setting for network communications, a gateway address setting, etc.

A non-volatile memory 117 is a non-volatile memory part which the network sub CPU 104 may access. The non-volatile memory 117 stores the configuration information which is referenced by at least the network sub CPU 104 during communication via a network. The content of the configuration information is commonly held by the non-volatile memory 116 and the non-volatile memory 117 when all of the network sub CPU 104, the network CPU 103 and the main CPU 101 are working.

The content of the non-volatile memory 116 may be modified based on a modification operation which is received by the main CPU 101 from the remote control receiver 114 and operating part 125. The content of the non-volatile memory 117 may be modified based on a modification operation of the protocol of the PJLink standard, which is received by the network sub CPU 104 via a network. However, when the content of one of the non-volatile memories is modified, the modification is reflected in the other non-volatile memory immediately. That operation is performed by the network sub CPU 104, the network CPU 103 and the main CPU 101.

However, the non-volatile memory 117 does not have to maintain all of the content stored in the non-volatile memory 116. The projector 100 works properly if it maintains configuration information of items used by the network sub CPU 104 for communication. However, when all of modifiable items are maintained according to the modification operation received via a network, the configuration may be modified even in stand-by state in which the main CPU 101 is turned off, and it may enhance the convenience of operations.

Figure 2:
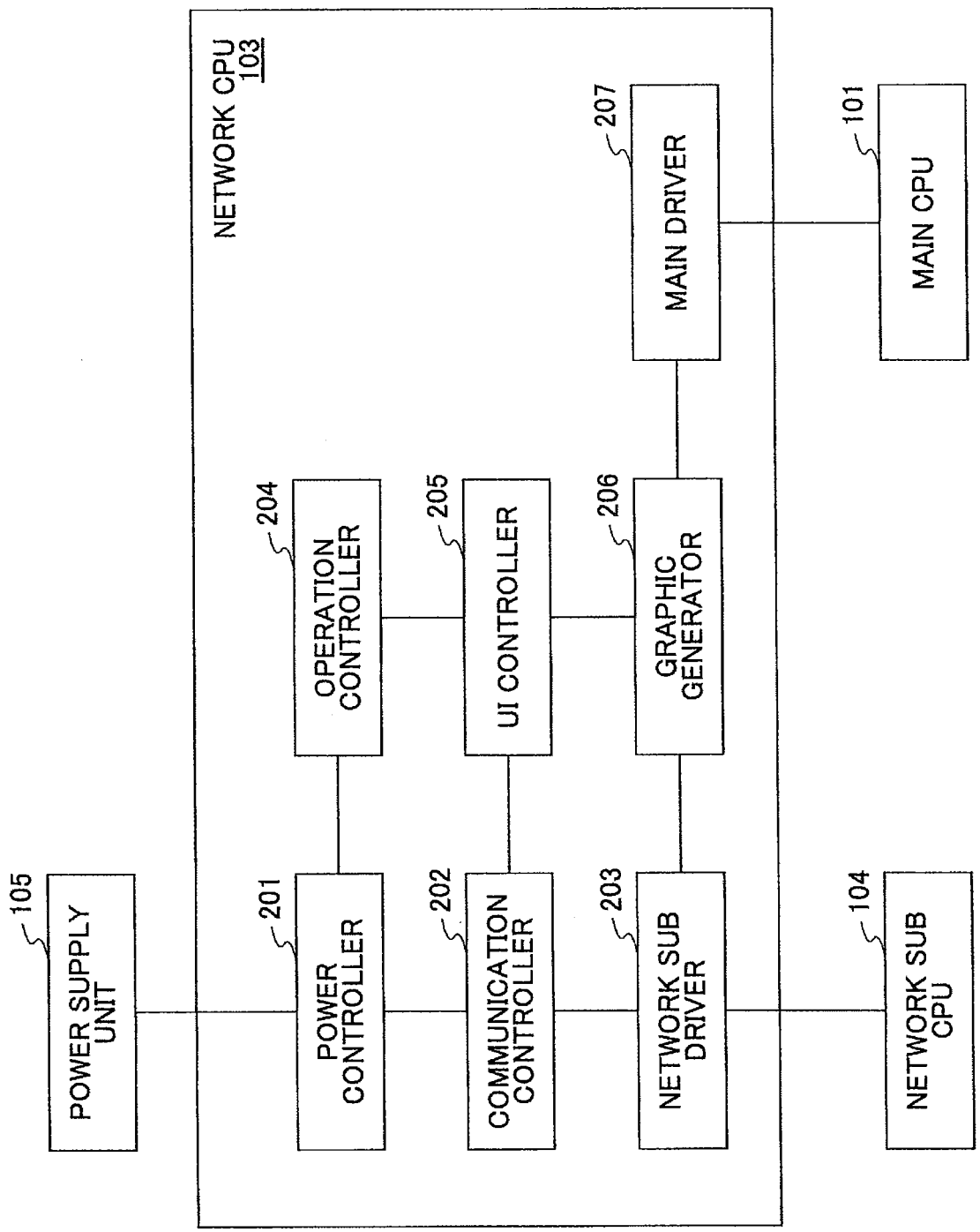
FIG. 2 is a functional block diagram of a network CPU described in FIG. 1.

FIG. 2 shows a functional block diagram of the network CPU 103. As described in FIG. 2, the network CPU 103 comprises a power controller 201, a communication controller 202, a network sub driver 203, an operation controller 204, a User Interface (UI) controller 205, a graphic generator 206 and a main driver 207. The power controller 201 has a function to turn off the power supply to the network CPU 103 itself.

The network sub driver 203 has a function relating to communication with the network sub CPU 104. The graphic generator 206 has a function to convert data of a projection target which is received from an external device or loaded from a USB memory into an image signal. The main driver 207 has a function for communication with the main CPU 101.

The control of power supply to each of the CPUs 101-104 is a characteristic point in the projector 100. FIG. 3 shows a list of power supply states prepared in the projector 100. As describe in FIG. 3, the power supply states of "off", "stand-by A" through "stand-by C", "active stand-by", "warming-up", "cooling-down-down" and "on" are prepared for the projector 100. In each state, the on/off state of power supplies to the sub CPU 102, the network sub CPU 104, the wired network interface 106, the wireless network interface 107, the main CPU 101, the lamp 121, the DMD 122, a fan 210 and the network CPU 103 are controlled as indicated in FIG. 3 respectively. Here, "low power" means that the power is supplied only for the parts which are required to turn on in order to archive the functions in the state, rather than being supplied for all of the CPUs. Thus, it indicates that some of functions of the CPUs are limited but it consumes low power compared to the normal CPU operations.

As will be seen in FIG. 3, the "off" state at the top of the table is the state in which there is no power supply from an external power source for the power supply unit 105. That indicates the supply cable is not connected with an outlet or is connected but the power is interrupted. In this case, no parts can receive power supply. The "on" state at the bottom of the table is a state to fully activate the projector 100, which is used to project an image. In this state, any modules receive power supply and any functions are enabled. Typically, the transition to this mode occurs when the direction to switch on the projector is detected.

In "stand-by A", "stand-by B", "stand-by C" and "active stand-by" states, although the power supply to the power supply unit 105 from the external power source is maintained, the projector 100 is not entirely activated but suspended with low power consumption. It is determined which mode (i.e. "stand-by A", "stand-by B", "stand-by C" and "active stand-by") is to be used depending on a configuration of the degree of energy saving, which indicates how the power is to be saved, specified by a user.

First, in the "stand-by A" state, the network communication function is disabled, thus it is the state in which the power consumption is most reduced compared to the other stand-by states. In this state, the power supplies to the main CPU 101 and network CPU 103 with high power consumption as well as the network sub CPU 104 are cut off. Only the power supply to the sub CPU 102 is maintained to detect a power-on command.

Second, in "stand-by B" state, only wired communication of network communication is enabled. This mode is aimed to reduce energy consumption next to the "stand-by A" state. In this case, unlike with "stand-by A" state, the power supply is turned on for the network sub CPU 104 to realize network communication functions as well as the wired network interface 106 to control wired communication.

Next, in "stand-by C" state, both wired and wireless network communication are enabled. This mode is aimed to reduce energy consumption next to the "stand-by B" state. In this case, in addition to the "stand-by B" state, the power supply is turned on for the wireless network interface 107 to operate wireless network communication. In this embodiment, a state to enable only wireless communication is not provided; however, it may be provided. In that case, it is preferable to allow a user to configure wired or wireless communication in the stand-by state and operate based on the configuration.

Next, in "active stand-by" state, the power consumption is the highest among the stand-by states. Fast start-up is considered in the state, thus the power supplies to the network CPU 103 and the main CPU 101 are turned on so that the projector starts projection immediately. Thus the projection may be started soon after transition from low power consumption state of the main CPU 101 to normal state and lighting of the lamp 121.

The "warming-up" state and "cooling-down" state are temporary and transient to transition to the other states. In the "warming-up" state, the lamp 121 is warmed so as to light it in stable condition. In the "cooling-down" state, the lamp 121 is cooled so as to turn off the projector 100 in safety. In both states, the power is supplied for any parts except the lamp 121 and DMD 122.

Figure 4:
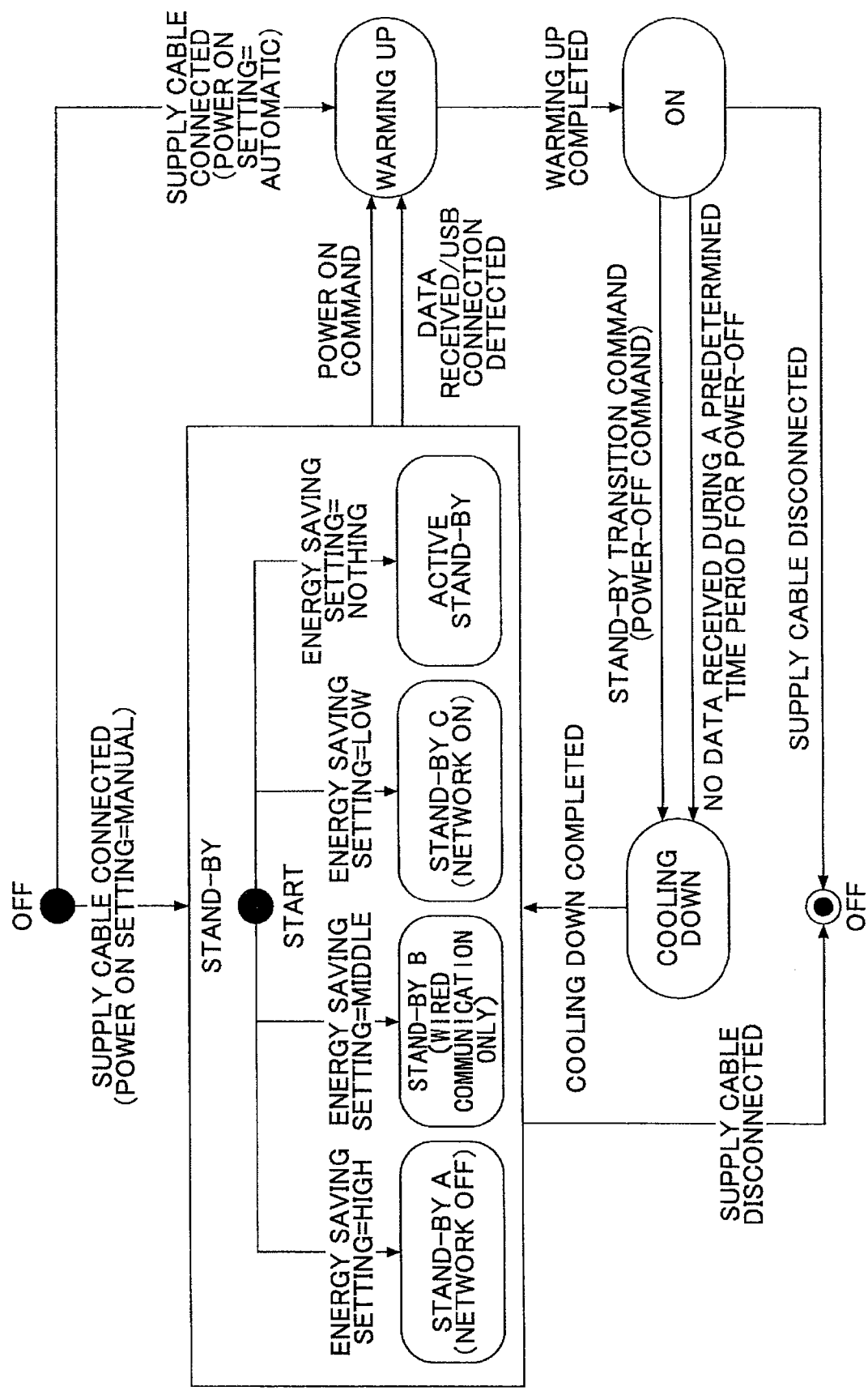
FIG. 4 is a state diagram of the states described in FIG. 3.

Referring to FIG. 4, the state diagram of the states described in FIG. 3 for the projector 100 is shown. In the "off" state described in the top of FIG. 4, for example, the supply cable is not connected with an outlet. The state transitions to the state corresponding to power on setting. The power on setting specifies whether transition to the "on" state is automatically done when the power is supplied from an external power source (automatic) or manually done by user's power-on operation (manual).

In the automatic case, the state transitions to "on" state on the right side via "warming-up" state. In particular, the power is supplied for the power supply unit 105 from an external power source and then the power is also supplied for the sub CPU 102 automatically. After that, the sub CPU 102 refers to the power on setting and recognizes the state should be transitioned to "warming-up" state, then it directs (including merely sending signals to turn on/off a switch) the power supply unit 105 to enable power supply to the main CPU 101, the network sub CPU 104 and the network CPU 103.

The main CPU 101 turned on by the power supply directs the power supply unit 105 to enable power supplies to the fan controller 110 and a fan 120 (not shown in FIG. 1). The network sub CPU 104 when started directs the power supply unit 105 to enable power supplies to the wired network interface 106 and the wireless network interface 107. Now the state transitions to "warming-up" state and the lamp 121 is warmed up. In addition, the main CPU 101 performs an initializing process for light control of the lamp 121 and image projection.

When the warming-up of the lamp 121 and the initializing process are completed, the main CPU 101 directs the power supply unit 105 to enable power supplies to the lamp controller 111, the lamp 121, the DMD controller 112, the DMD 122 (not shown in FIG. 1) and light the lamp 121 to start image projection. Now the transition to "on" state is completed.

On the other hand, in a case where the power on setting indicates "manual" when the power cable is inserted, the state transitions from "off" state to "stand-by" state. Here, it depends on the value of the energy saving setting as to which state of "stand-by A", "stand-by B" or "stand-by C" the state transitions. The energy saving setting determines the degree of energy saving for the projector 100. The value may be "high", "middle", "low" or "none".

First, when the energy saving setting is "high", the stand-by state is "stand-by A". The specific steps are as follows. When the power is supplied for the power supply unit 105 from an external power source, in common with the transition to "on" state, the power supply to the sub CPU 102 is automatically started. After that, the sub CPU 102 refers to the power on setting and energy saving setting to find that it should transition to "stand-by A" state, and then stands by. With that operation, the transition to "stand-by A" state completes and the sub CPU 102 monitors a subsequent instruction (in particular, the power-on command).

Next, when the energy saving setting is "middle", the stand-by state is "stand-by B". The specific steps are as follows. When the power is supplied for the sub CPU 102 in the same manner as the case of "stand-by A", and the sub CPU 102 finds that it should transition to "stand-by B" state, the sub CPU 102 directs the power supply unit 105 to enable power supplies to the network sub CPU 104 and the network CPU 103.

Then, the network sub CPU 104 started by the power supply refers to the energy saving setting and finds it should transition to "stand-by B" state. The network sub CPU 104 directs the power supply unit 105 to enable power supply to the wired network interface 106 but disable power supply for the network CPU 103. After that, the network sub CPU 104 performs an initializing process required for starting communication, and completes the transition to "stand-by B" state. In this state, monitoring of power-on command via a wired network or modification of settings of the projector 100 via the wired network may be done in addition to the case of "stand-by A" state. Although the power is supplied for the network CPU 103, the supply is stopped immediately and the CPU 103 does not perform any operations.

Next, when the energy saving setting is "low", the stand-by state is "stand-by C". The specific steps are as follows. In addition to the steps of the above "stand-by B" state, the network sub CPU 104 directs the power supply unit 105 to enable power supply to the wireless network interface 107 and then it performs an initializing process required for starting communication. In this state, monitoring of power-on command via a wireless network or modification of settings of the projector 100 via the wireless network may be done in addition to the case of "stand-by B" state.

Next, when the energy saving setting is "nothing", the stand-by state is "active stand-by". The specific steps are as follows. When the sub CPU 102 finds that it should transition to "active stand-by" state, it directs the power supply unit 105 to enable power supply to the main CPU 101. The main CPU 101 refers to the energy saving setting and finds it starts due to the "active stand-by" state, and then it starts with low power and performs the initializing process except lighting the lamp 121 and image projection.

Also, when the network sub CPU 104 refers to the energy saving setting to find that it should transition to "active stand-by" state, the power supply to the network CPU 103 from the power supply unit 105 is not turned off but kept on. As a result, the network CPU 103 also starts and it performs the required initializing process. After that, the transition to "active stand-by" state completes.

In the state, a start-up process for the main CPU 101 and the network CPU 103 on transition to "on" state is not required so that the transition may complete in a short time. In any stand-by states, the state transitions to "on" state via "warming-up" state on detection of the power-on command. The power-on command may be invoked by an operation of the power-on key on the projector 100 which is included in the operating part 125, an operation of the power-on button on a remote controller, a "PON" command from a control terminal (not shown), a request of power-on from a PJLink application or external link application via a network.

The sub CPU 102 detects the command from the power-on key, the remote controller or the control terminal and conveys it to the network sub CPU 104. The command sent via a network is detected by the network sub CPU 104. When the sub CPU 102 detects the power-on command and the state is "stand-by A" (i.e. the power supply to the network sub CPU 104 is turned off), the sub CPU 102 directs the power supply unit 105 to enable the power supply to the network sub CPU 104. In any stand-by state, it notifies the network sub CPU 104 of receipt of the power-on command.

In any case, when the network sub CPU 104 receives the notification or detects the power-on command by itself, it directs the sub CPU 102 to enable the power supply to the main CPU 101 (in case of "active stand-by" state, it directs the sub CPU 102 to transition from low power state to normal state).

When the sub CPU 102 receives the direction, in common with the above case of transition to "warming-up" state, it directs the power supply unit 105 to turn on the power supply to the main CPU 101. Also, the network sub CPU 104 directs the power supply unit 105 to turn on the power supply to the network CPU 103 (unnecessary in case of "active stand-by" state). As a result of the process, the network CPU 103 is started. When there is a network interface such that the power supply is off state, the network sub CPU 104 directs the power supply unit 105 to turn on the power supply.

After the above operations, each part finishes the required initializing process and transitions to "warming-up" state, and then transitions to "on" state in common with the case after the transition from "off" state to "warming-up" state. Here, receipt of projection data from a network or detection of connection of a USB memory into the USB_I/F 108 may be used as a trigger to transition from a stand-by state to "on" state. That results in improvement of usability as the state of the projector 100 can transition to "on" state by providing data required for projection without any user operation of the power switch. Here, in "active stand-by" state, the network CPU 103 can detect the condition of the USB_I/F 108. In order to detect it even in the other state, the projector 100 may be configured so that the network sub CPU 104 detects it.

Figure 5:
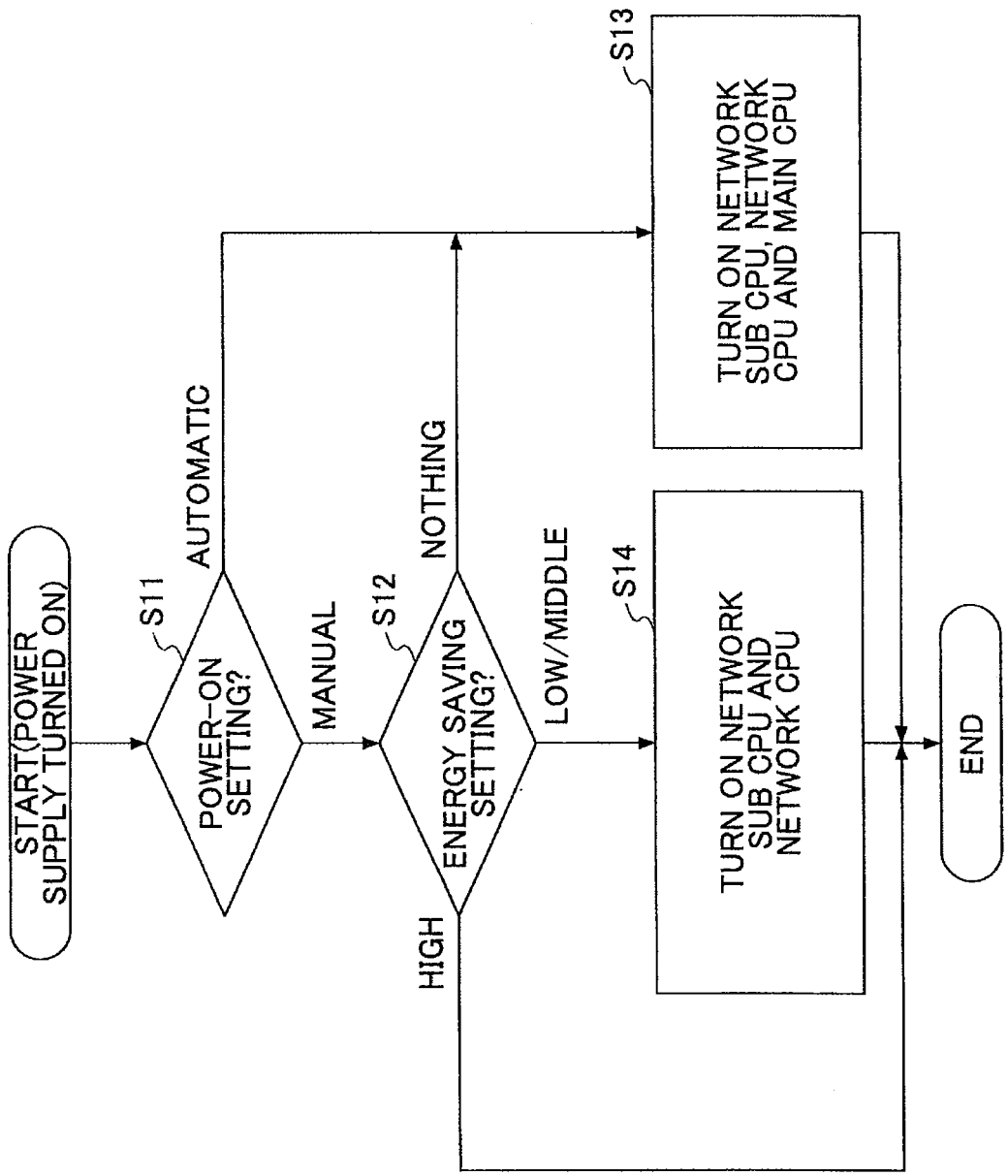
FIG. 5 is a flowchart of procedures performed by the sub CPU during start up.

Here, the steps performed by the sub CPU 102 and the network sub CPU 104 are described with flowcharts in order to transition to the above stand-by states and "on" state. Referring to FIG. 5, the steps performed by the sub CPU 102 on start-up are described. The power supply to the power supply unit 105 from an external source is turned on, and the power supply to the sub CPU 102 is started, then the steps described in FIG. 5 are executed after the required initializing process.

In the steps, the sub CPU 102 refers to the power on setting and energy saving setting (S11, S12). If the power on setting indicates "automatic", the sub CPU 102 determines that it should transition to "on" state and it directs the power supply unit 105 to turn on the power supplies to the network sub CPU 104, the network CPU 103 and the main CPU 101, and then finishes the steps. On the other hand, if the power on setting indicates "manual" and energy saving setting indicates "nothing", the sub CPU 102 determines that it should transition to "active stand-by" state and it directs the power supply unit 105 to turn on the power supplies to the network sub CPU 104, the network CPU 103 and the main CPU 101 (S13).

If the power on setting indicates "manual" and energy saving setting indicates "low" or "middle", the sub CPU 102 determines that it should transition to "stand-by B" or "stand-by C" state and it directs the power supply unit 105 to turn on the power supplies to the network sub CPU 104 and the network CPU 103 (S14).

If the power on setting indicates "manual" and energy saving setting indicates "high", the sub CPU 102 determines that it should transition to "stand-by A" state and finishes the steps.

Figure 6:
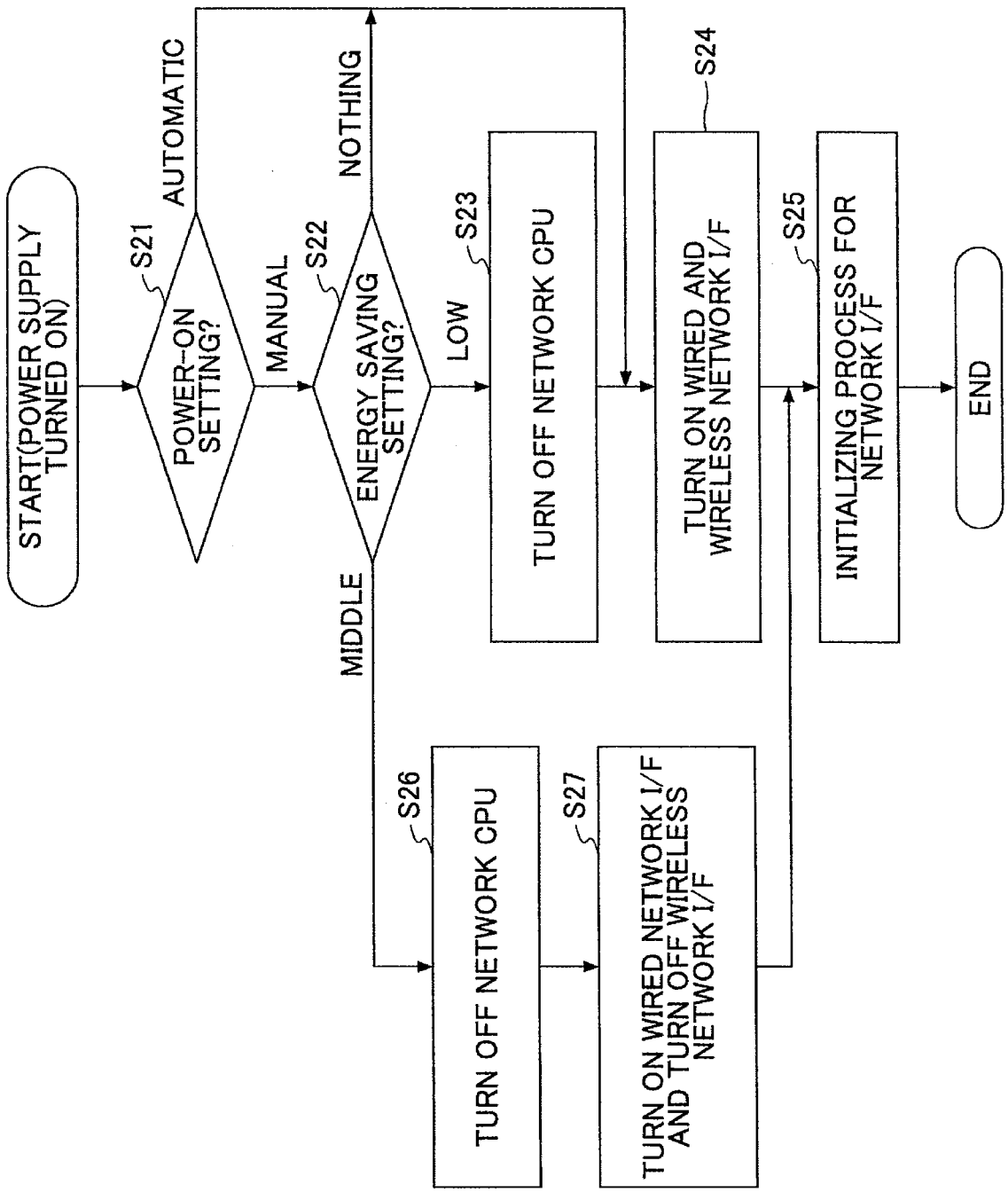
FIG. 6 is a flowchart of procedures performed by the network sub CPU during start up.

Referring to FIG. 6, a flowchart performed by the network sub CPU 104 on its start-up is described. When the power supply to the network sub CPU 104 from power supply unit 105 is started, the steps described in FIG. 6 are executed after the required initializing process.

In the steps, the network sub CPU 104 refers to the power on setting and energy saving setting (S21, S22). If the power on setting indicates "automatic", the network sub CPU 104 determines that it should transition to "on" state and it directs the power supply unit 105 to turn on the power supplies to the wired network interface 106 and the wireless network interface 107 (S24). After that, the network sub CPU 104 performs the initializing process of the network interface started (S25), and finishes the steps. In that case, the power supply to the network CPU 103 is kept on, and that state is turned on at step S13 in FIG. 5.

If the power on settings indicates "manual" and energy saving settings indicates "nothing", the network sub CPU 104 determines that it should transition to "active stand-by" state and it directs the power supply unit 105 to turn on the power supplies to the wired network interface 106 and the wireless network interface 107 (S24). In this case, the power supply to the network CPU 103 is kept on, that state is turned on at the step S13 in FIG. 5.

If the power on settings indicates "manual" and energy saving settings indicates "low", the network sub CPU 104 determines that it should transition to "stand-by C" state. In this case, the network sub CPU 104 directs the power supply unit 105 to turn off the power supply to the network CPU 103 which should have been turned on (S23). After that, in common with the above case, the network sub CPU 104 turns on the power supplies to the wired network interface 106 and wireless network interface 107 (S24) and then it performs the initializing process (S25).

If the power on settings indicates "manual" and energy saving settings indicates "middle", the network sub CPU 104 determines that it should transition to "stand-by B" state. In this case, the network sub CPU 104 directs the power supply unit 105 to turn off the power supply to the network CPU 103 (S26) which should have been turned on by the sub CPU 104 at the step S14 in FIG. 5. After that, the network sub CPU 104 directs the power supply unit to turn on the power supply to the wired network interface 106 and to turn off the power supply to the wireless network interface 107 (S27). The network sub CPU 104 performs the initializing process of the started network interface (e.g. the wired network interface 106 only) (S25), and finishes the steps. When the power on settings indicates "manual" and energy saving settings indicates "high", the state is supposed to transition to "stand-by A" state on the connection of the power cable, thus the network sub CPU 104 could not start. Therefore, any steps for that case are not described here.

Figure 7:
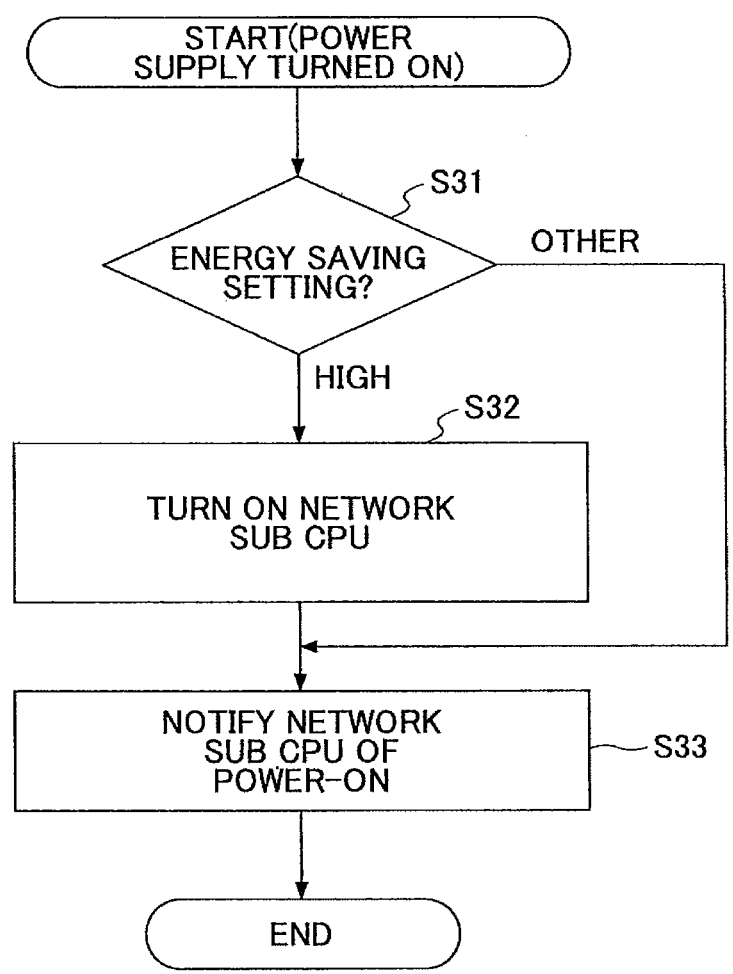
FIG. 7 is a flowchart of procedures performed by the sub CPU on detecting a power-on command.

Referring to FIG. 7, a flowchart performed by the sub CPU 102 when it detects a power-on command is described. When the sub CPU 102 detects the power-on command in any stand-by states as described above, it executes the steps in FIG. 7.

At first, the sub CPU 102 refers to the energy saving setting (S31), and if the setting indicates "high", it directs the power supply unit 105 to turn on the power supply to the network sub CPU 104 (S32). This is because the present state is "stand-by A" and the network sub CPU 104 is not supposed to be started. In any case (waiting for the start-up of the network sub CPU 104 follows the step S32), the sub CPU 102 notifies the network sub CPU 104 of the power-on (S33), and then finishes the steps.

Figure 8:
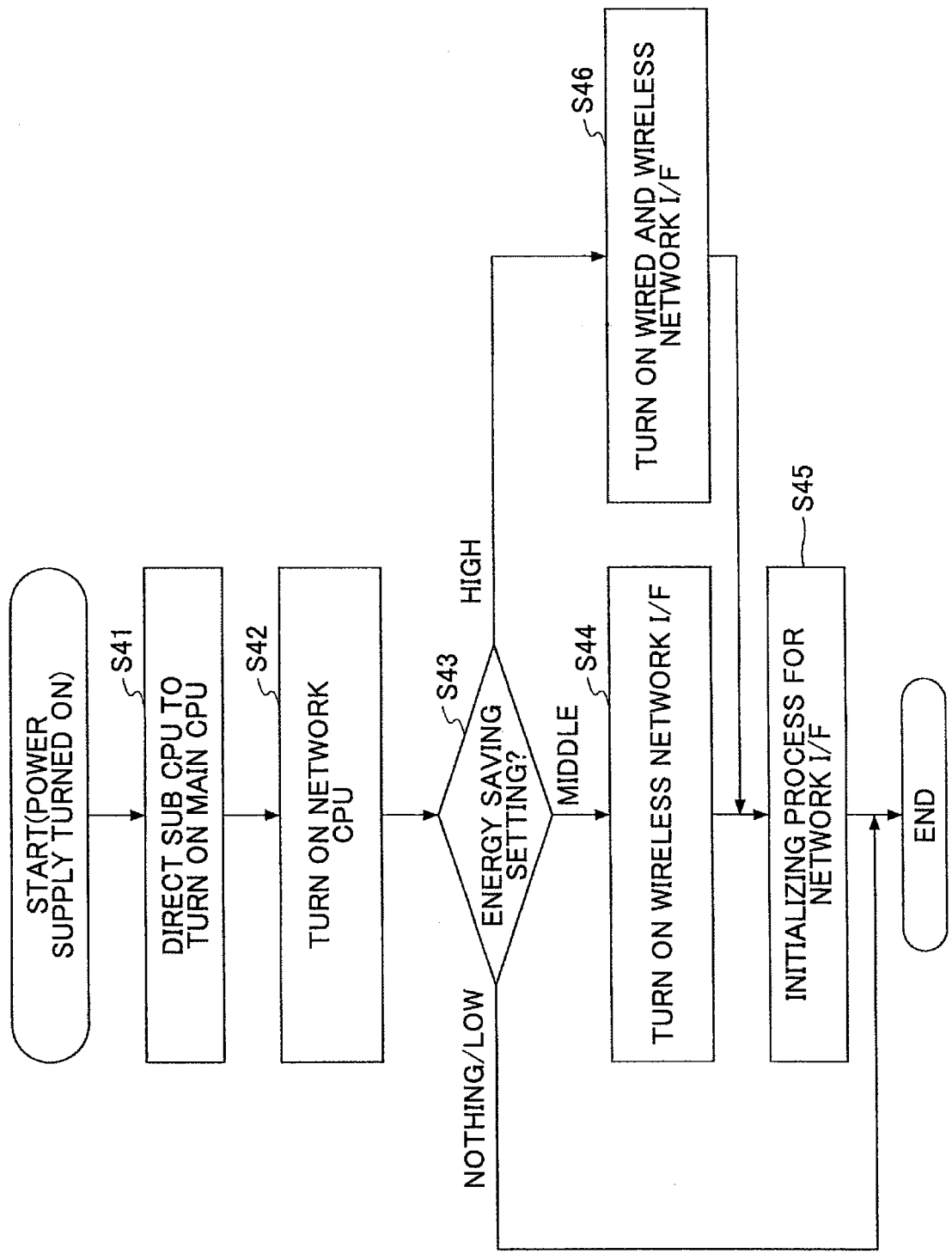
FIG. 8 is a flowchart of procedures performed by the network sub CPU on detecting either a power-on direction or a switch-on notification.

Referring to FIG. 8, a flowchart performed by the network sub CPU 104 when it detects a power-on command or switch-on notification is described. When the network sub CPU 104 detects the power-on command in any stand-by states as described above or the switch-on notification transmitted at step S33 in FIG. 7, it executes the steps in FIG. 8.

First, the network sub CPU 104 directs the sub CPU 102 to turn on the power supply to the main CPU 101 (S41). Responding to the direction, the sub CPU 102 directs the power supply unit 105 to turn on the power supply to the main CPU 101 (not shown in FIG. 1). That is, the network sub CPU 104 triggers to turn on the power supply to the main CPU 101.

Next, the network sub CPU 104 directs the power supply unit 105 to turn on the power supply to the network CPU 103 (S42). After that, the network sub CPU 104 refers to the energy saving setting and determines the current stand-by state (S43), and starts network interfaces which have not started yet depending on the state. When the energy saving setting indicates "middle", the current state is "stand-by B" state. In this case, as the wireless network interface 107 is not started, the network sub CPU 104 directs the power supply unit 105 to turn on the power supply to the wireless network interface 107 (S44) and performs its initializing process (S45). When the energy saving setting indicates "high", the current state is "stand-by A" state. In this case both of the wired network interface 106 and the wireless network interface 107 are not started, so the network sub CPU 104 directs the power supply unit 105 to turn on the power supplies to them (S46) and performs their initializing process (S45). When the energy saving setting indicates "nothing" or "low", no step is performed here. After that, the network sub CPU 104 finishes the steps in any case.

On the projector 100, the sub CPU 102 and the network sub CPU 104 perform the above steps respectively and thereby the state may transition from the "off" state to "on" state directly or indirectly via the one of stand-by states. On the transition from "active stand-by" to "on" state, the network sub CPU 104 notifies the main CPU 101 via the network CPU 103 to transition to "on" state, and then the main CPU 101 starts the fan 120, lamp 121 and DMD 122. These operations are not described in FIG. 5 to FIG. 8.

Referring to FIG. 4 again, the state of the projector 100 transitions to a stand-by state via a cooling-down state when the projector in "on" state detects an instruction for transition to stand-by state (power-off command). The state to be transitioned to is determined depending on the energy saving setting in common with the connection of the power cable. The power-off command may be invoked by an operation of the power-on key on the projector 100 which is included in the operating part 125, an operation of the power-on button on a remote controller, a "POF" command from a control terminal (not shown), a request of power-off from a PJLink application or external link application via a network.

The main CPU 101 detects the command from the power-on key, the remote controller or the control terminal. The command sent via a network is detected by the network CPU 103 based on the data which it receives from the network sub CPU 104. Any information is gathered into the main CPU 101 once. After showing a confirmation display if desired, the steps to transition from cooling-down state to stand-by state are performed.

Figure 9:
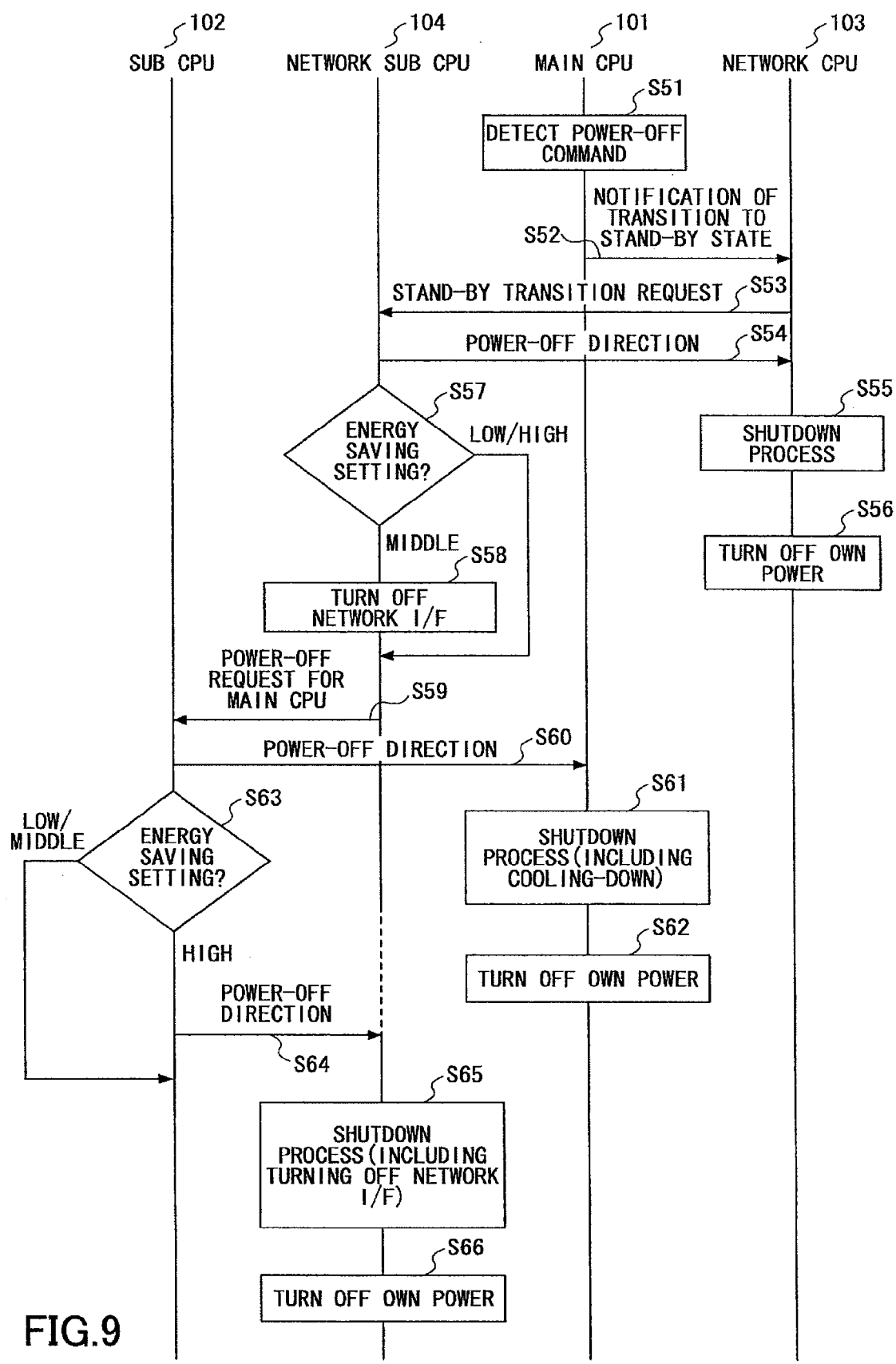
FIG. 9 is a sequence of procedures for transition into stand-by state.

FIG. 9 shows a sequence to transition to the stand-by state. For transition to "active stand-by", description is skipped because it is enough for the main CPU 101 merely to stop the fan 120, the lamp 121 and the DMD 122 and transition to a low power consumption mode. As illustrated in FIG. 9, when the main CPU 101 detects a power-off command (S51), it notifies the network CPU 103 of transition to a stand-by state. Responding to that, the network CPU 103 transmits a transition request to stand-by to the network sub CPU 104.

On the receipt of the transition request to stand-by, the network sub CPU 104 starts steps to turn off power supply to each part of the projector 100. First, the network sub CPU 104 directs the network CPU 103 to turn off the power (S54). When the network CPU 103 receives the direction, it performs the required shutdown operation (S55) and directs the power supply unit 105 to turn off the power supply to itself. The reason why the network sub CPU 104 does not direct the power supply unit 105 to turn off the power supply to the network CPU 103 directly is to avoid failure caused by sudden stoppage of the network CPU 103. Thus the direction at step S54 is a trigger to turn off the power supply to the network CPU 103.

In a case where the degree of power saving (i.e. the energy saving setting) is "middle", the network sub CPU 104 directs the power supply unit 105 to turn off the power supply to the wireless network interface 107, wherein the supply is turned off on "stand-by B" state. In a case where the degree of power saving is "low", the network interface need not to be stopped. In a case where the degree of own saving is "high", no step is described here because the network sub CPU 104 itself is stopped later. However, it may be stopped here.

Next, the network sub CPU 104 requests the sub CPU 102 to turn off the power of the main CPU 101 (S59). On receipt of the request, the sub CPU 102 directs the main CPU 101 to turn off the power (S60). When the main CPU 101 receives the direction, it performs the required shutdown operation (S61) and then directs the power supply unit 105 to turn off the power supply to itself (S62).

The shutdown operation at step 61 includes cooling of the lamp 121. During the cooling, the state becomes "cooling-down" state. Or, the main CPU 101 may perform the cooling before step S52. The reason why the network sub CPU 104 does not direct the power supply unit 105 to turn off the power supply to the main CPU 101 directly is to avoid failure caused by sudden stoppage of the main CPU 101. Thus the request at step S59 is a trigger to turn off the power supply to the main CPU 101.

Next, the sub CPU 102 refers to the setting of the degree of the power saving (i.e. the energy saving setting), and when it indicates "high", the sub CPU 102 directs the network sub CPU 104 to turn off the power. On receipt of the direction, the network sub CPU 104 performs the required shutdown operation (S65) and then directs the power supply unit 105 to turn off the power supply to itself (S66). The shutdown operation at step 65 includes stopping the power supply to a network interface to which the power is supplied.

When the degree of energy saving (energy saving setting) is either "low" or "middle", stoppage of the network sub CPU 104 is not required, and thus the sequence finishes. On the projector 100, each CPU performs the operations respectively, and thereby the transition from "on" to one of the stand-by states as described in FIG. 4 is done. Here, the order of steps S54, S57 to S59, performed by the network sub CPU 104 is not limited to that as described in FIG. 9.

Referring back to FIG. 4, on the projector 100, the power cable may be unplugged to stop the power supply to the power supply unit 105. When it occurs in a stand-by state or "on" state, the state of the projector 100 transitions to "off" state because it cannot be powered on due to the lack of the power supply. It is not officially permitted to unplug the power cable in "warming-up" state or "cooling-down" state even although it is possible.

As described above, on the projector 100, the four CPUs—main CPU 101, sub CPU 102, network CPU 103 and network sub CPU 104—are arranged to turn on/off their own power supplies to each CPU and thereby the detailed control for power consumption is achieved. In particular, a part which is powered may be configurable by a user based on the energy saving setting so that the power consumption in a stand-by state may be minimum and suitable for the user's intended purpose.

The network sub CPU 104 as a CPU for handling network communication and the network CPU 103 to deal with high load data operations are arranged separately, and in a stand-by state, basically only the network sub CPU 104 is powered. That decreases power consumption in a stand-by state while the network communication is enabled in the stand-by state.

Also, various kinds of power states may be arranged in addition to the states described in FIG. 3 and FIG. 4 on the projector 100, and they may be used depending on various kinds of triggers and settings. For example, even during projection in "on" state, the power supply for the network CPU 103 may be turned off when data input from an external device via a network has not been detected for a predetermined time period.

As the network CPU 103 need not perform image processing during projection by image signal input from the image input 109, power consumption in "on" state may be reduced to stop the power for it. In that case, the network sub CPU 104 may control the power by performing steps S54 to S56 in FIG. 9.

The network sub CPU 104 is suitable for monitoring data reception because it controls network communication, thus the network communication function itself is kept enabled by the network sub CPU 104.

Furthermore, when the network CPU 103 detects data input to be converted into an image signal from an external device via a network while the network CPU 103 stops, the network sub CPU 104 may direct the power supply unit 105 to turn on the power supply to the network CPU 103. In that case, the step is performed in common with S42 in FIG. 8. As a result, if any data operation for data received via a network is required, the network CPU 103 may handle it immediately.

The power supply to each part may be controlled based on a selection of interface for data input in a stand-by state or "on" state (e.g. selection of either receiving target data for projection via a network or input the data from the image input 109). Or network interfaces to be used may be selected (e.g. either wired or wireless or both of them). The selection is made through an operation part, a remote controller or configuration performed via a network. In any method, the selection may be reported to the network sub CPU 104.

Figure 10:
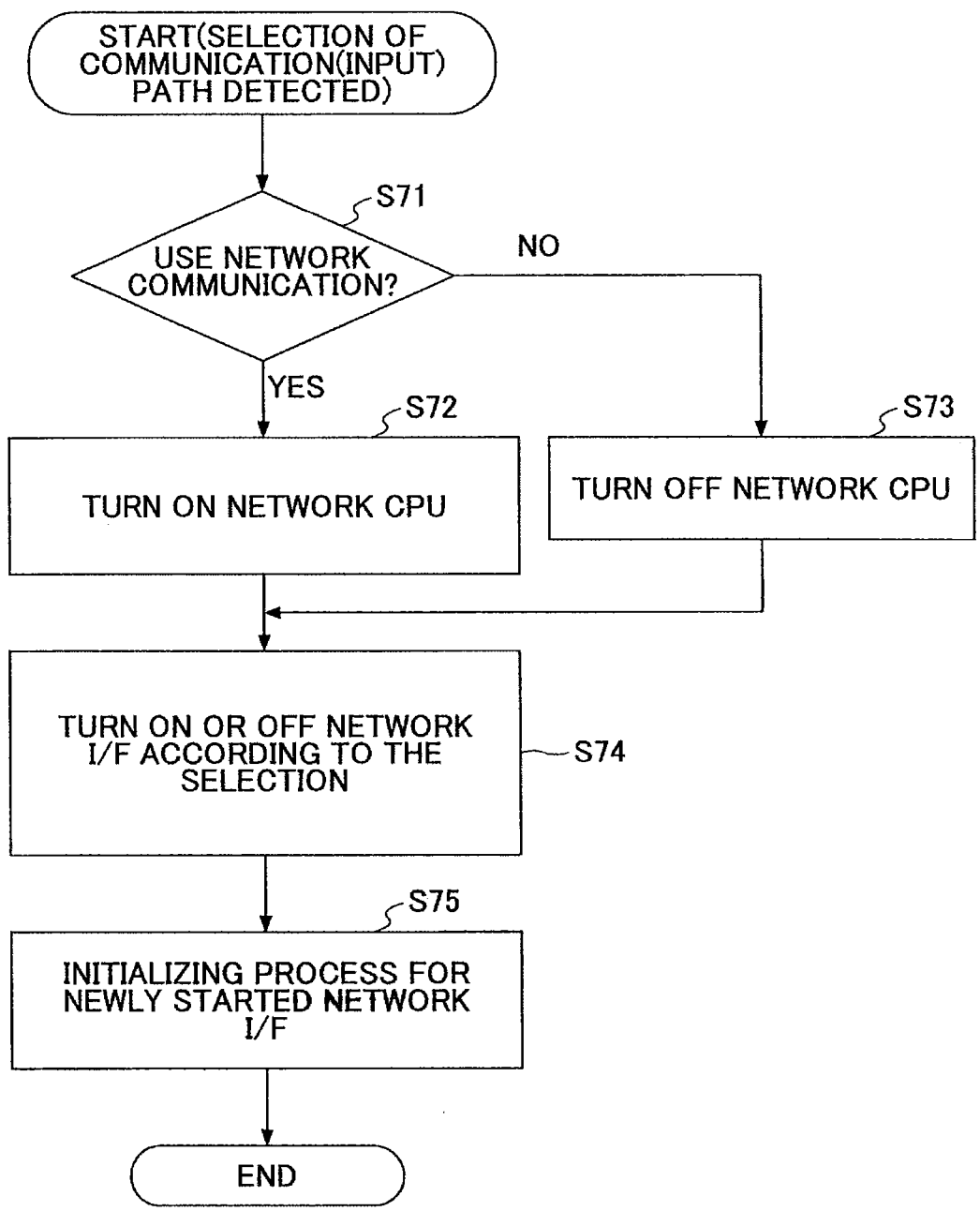
FIG. 10 is a flowchart of procedures performed by the network sub CPU on detecting a selection of interfaces for use of data input.

FIG. 10 shows a flowchart performed by the network sub CPU 104 when the selection of interface for data input is detected. When the selection is detected, the network sub CPU 104 starts the steps in FIG. 10. At first, the network sub CPU 104 determines whether the selection indicates network communication is used (S71). Then, if the network communication is used, as well as the step S42 in FIG. 8, the network sub CPU 104 directs the power supply unit 105 to turn on the power supply to the network CPU 103 (S72). When the power supply has turned on, the direction may not be done. Or if the network communication is not used, as well as steps S54 to S56 in FIG. 9, the network sub CPU 104 directs the network CPU 103 to turn off the power (S73). Also, when the power supply has been turned off, the direction may not be done.

After both cases, the network sub CPU 104 directs the power supply unit 105 to turn on the power supply to the network interface to be used based on the selection and to turn off the network interface not to be used (S74). The network sub CPU 104 performs the initializing process for the newly started network interface (S75), and then finishes the steps.

For the aforementioned steps, the network CPU 103 may be automatically turned off in case the function is not used and thereby the power consumption may be decreased. Also, as a network interface which is not used may be stopped, the power consumption may be decreased regardless of whether the state is stand-by or "on".

The operation on the projector 100 when the power supply to the network CPU 103 is started is described below. On the projector 100, as described above, the settings may be externally modified by function of the network sub CPU 104 even when the network CPU 103 or main CPU 101 is not turned on.

In that case, the display does not work and thereby the user cannot realize the modification of the settings. That is, during direct operation for the projector 100, the settings may be modified while user does not realize it. Also in case that the network CPU 103 or the main CPU 101 is turned off, the network sub CPU 104 may communicate with an external device via a network to change conditions of the communication. For example, reduction of wireless signal strength interrupts communication for an access point or a network defect blocks network communication.

The projector cannot notify a user of an occurrence of such event, and thus she directly operates the projector unconscious of the change of the conditions. Thus, at the point of start-up of the network CPU 103, the projector may notify the user of information about a state of communication and the required information about a configuration. For that operation, if an unexpected event changes the condition in a stand-by state, a user may know the change of the condition and the settings when she executes the main function of the projector 100.

Notification is done when the network CPU 103 is turned on, that is, it is done when the state transitions to "on" state. Thus, the main CPU 101 may perform the process of the notification on the start-up as described later. In addition, as described above, when the network CPU 103 starts or stops regardless of transition to "on" state or stand-by state, the operation relating to the notification may be done after confirming that the start-up is caused by the transition to "on" state or may be performed by the main CPU 101.

Figure 11:
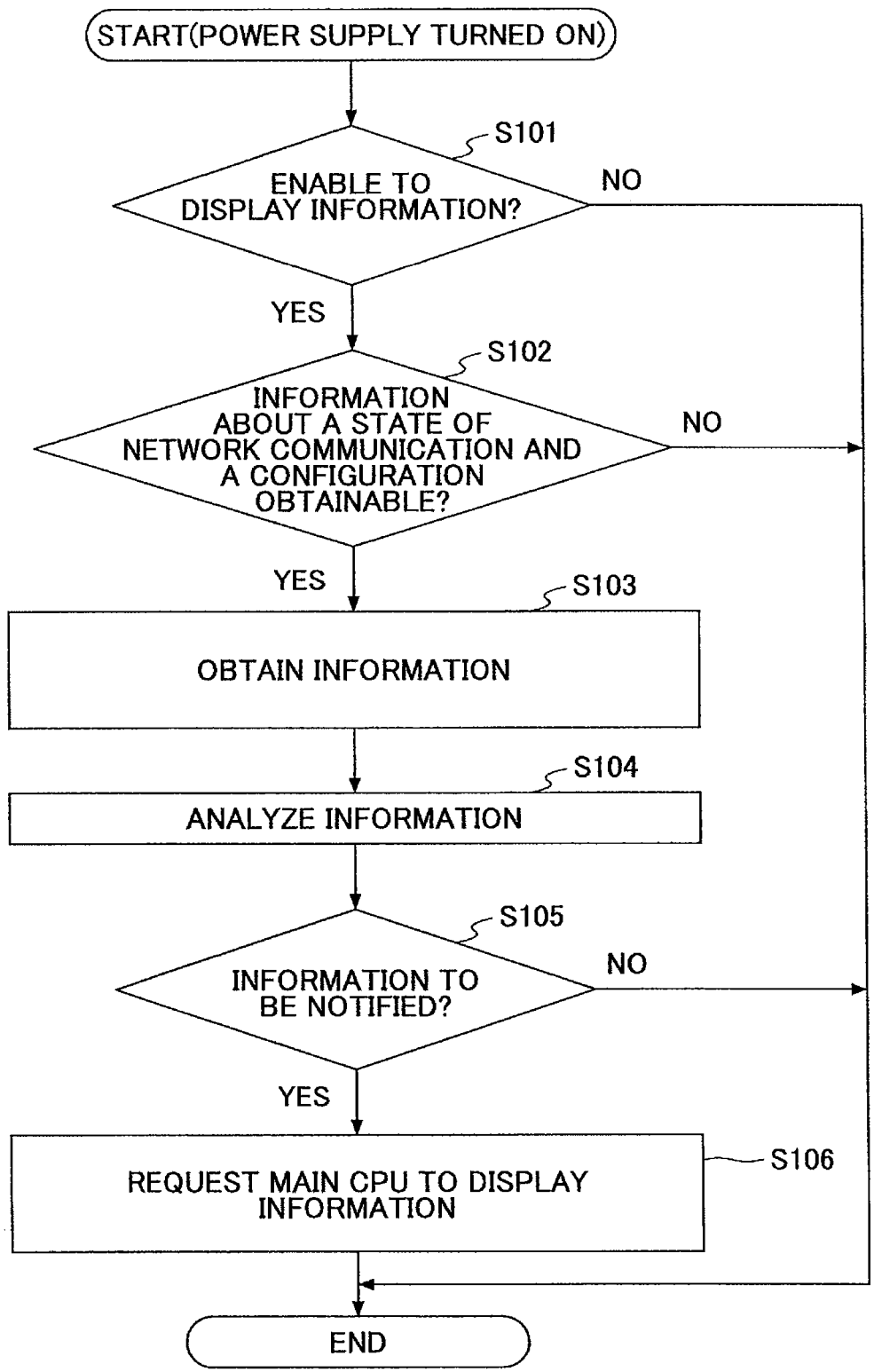
FIG. 11 is a flowchart of procedures relating to notification of information about a state of communication and a configuration performed by the network CPU.

FIG. 11 shows a flowchart of operations relating notification of information about a state of communication and a setting, which is performed by the network CPU 103. When the network CPU 103 receives the power supply and finishes the required initializing process, the network CPU 103 starts the steps in FIG. 11.

First, the network CPU determines whether the projector 100 is in the condition that it may display the information relating to the notification (S101). The information cannot be displayed in case the main CPU 101 controlling the display is not started. Much information cannot be displayed in case the lamp 121 and DMD 122 don't work. Thus the determination may be based on the criteria illustrated in FIG. 12 which are based on conditions of power supply to each part.

In FIG. 12, "LED only" indicates that only a lamp in the display 123 is available. It is not enough to display working conditions and settings and thus the projector is "unable to display" them. However, it may be enough to display an incidence of network error or simple information. In that case, the network CPU 103 may determine that the projector is "enabled to display" them.

A combination of "on" and "off" which is impossible in the aforementioned operation is described in FIG. 12. If the memory has enough room for storing a table like that, all of the combinations may be stored in it for future extension. Much the same is true of the following tables.

When the network CPU 103 determines "enabled to display" at step S101, it determines whether information about a state of network communication and a configuration may be obtained. Here, the communication state and the information of the configuration may not be obtained when the network sub CPU 104 does not work. If each network interface does not work, the interface may not obtain the information (however, the information of the configuration may be obtained by the network sub CPU 104). They may be used for the determination. The determination may be done based on criteria depending on a state of power supply to each part illustrated in FIG. 13 (illustrative only). In case the information about a state of communication needs to be displayed but the state is "Obtainable (setting only)", the network CPU 103 determines "Not obtainable".

If the network CPU 103 determines "Obtainable" at step S102, it obtains information about a state of network communication and a configuration from the network sub CPU 104 (S103) and analyses them (S104). Based on the result, the network CPU 103 determines whether information to be reported to a user exists (S105). If so, the network CPU 103 gives the information to the main CPU 101, requests the main CPU 101 to display (S106), and then finishes the steps. At step S103, the network CPU 103 does not have to obtain all information administered by the network sub CPU 104, but may obtain information for which display and analysis are possible. In case some of network interfaces don't work, the network CPU 103 may obtain information on working network interfaces.

If the network CPU 103 determines "no" at step S101, S102 or S105, it finishes the steps. The main CPU 101 which receives the request at step S106 controls the DMD 122 and the display 123 to display the information and notify the user. Or the notification may be displayed on an external device of the user by sending the notification to the external device via a network.

FIG. 14 shows an exemplary analysis method at step S104. In this analysis, the network CPU 103 determines whether the projector is configured to use a network for image input (S111). If not, because it is useless to show network condition or configuration information, the network CPU 103 determines that no information exists to be displayed (S121) and finishes the analysis. Alternatively, the message indicating a network is not used may be displayed.

If the network CPU 103 determines that the projector is configured to use the network at step S111, it further determines which is selected either a wired network or a wireless network (S112, S113). When both of them are selected, it is substantially similar to not using the network, thus the network CPU 103 determines no information exists to be displayed (S121) and finishes the analysis. If either of them is selected at step S112 or S113, the network CPU 103 determines whether a network connection setting has been done (S114). If not, the network CPU 103 determines such condition should be displayed so that the user can understand that the setting process is ongoing (S122), and finishes the analysis.

If the setting has been done at step S114, the network CPU 103 determines whether DHCP is enabled (S115). If enabled, the network CPU 103 determines whether it can connect with a DHCP server (S116). If not, the network CPU 103 determines such condition should be displayed because the user can understand that the projector cannot connect with the DHCP server (S123), and finishes the analysis. If the network CPU 103 determines that it can connect with the DHCP server, it further determines that such condition should be displayed so that the user can understand that the projector is connected to network (S124) and finishes the analysis.

If DHCP is not enabled at step S115, the network CPU 103 determines whether a host using the identical IP address with the projector exists on the network. If such host exists (Yes at S117), the network CPU 103 determines that such condition should be displayed so that the user can understand that a host using the identical IP address exists (S125) and finishes the analysis. If such host does not exist at the step S117, the network CPU 103 determines whether it can connect with a gateway (S118). If it can connect with the gateway (Yes at S118), the network CPU 103 determines that such condition should be displayed so that the user can understand that the projector is connected to a network (S124), and finishes the analysis.

If it cannot connect with the gateway, the network CPU 103 determines that such condition should be displayed so that the user can understand that the projector cannot connect with the gateway (S126), and finishes the analysis. It will be appreciated that the network CPU 103 may determine which part of settings obtained depending on communication status is displayed.

For the steps performed by the network CPU 103, in case a configuration or a state of communication of the projector 100 is changed while they cannot be displayed, the user can recognize the condition after the display becomes available. If the main CPU 101 is not started and thereby it is not able to display or the network sub CPU 104 is not started and thereby the required information cannot be obtained, the display or analysis is not performed. That results in reduction of useless operation and workload.

Although the power supply to the network CPU 103 is kept on when the state transitions from "active stand-by" to "on", the network CPU 103 may similarly perform the steps in FIG. 11. The notification of the user may be done by, unlike the aforementioned projection or light pattern, display on an LCD panel or by voice output with a speaker when the projector comprises such hardware.

As stated above, The main CPU 101 can perform the steps in FIG. 11. FIG. 15 shows a flowchart of such a case. When the power supply to the main CPU 101 is started and the required initializing process is done, the main CPU 101 starts the steps in FIG. 15. In case the state transitions from "active stand-by" to "on" state, the same steps are performed.

The main CPU 101 determines whether the projector 100 is in a state in which the information relating to the notification may be displayed (S131). The criteria for the determination may be the same as step S101 in FIG. 11. If the information may be displayed, the main CPU 101 determines whether information about a state of network communication and a configuration is obtainable (S132). In order to request the network CPU 103 to obtain the information from the network sub CPU 104, the main CPU 101 considers the state of the network CPU 103. That is, the main CPU 101 determines the information is not obtainable if the network CPU 103 does not work. The main CPU 101 determines based on a criteria in FIG. 16 depending on a state of power supply to each part.

If the main CPU 101 determines obtainable at step S132, it requests the network CPU 103 to send the information about a state of network communication and a configuration, and obtains them (S133). When the network CPU 103 receives the request, it obtains the required information from the network sub CPU 104 and sends it to the main CPU 101. The main CPU 101 analyzes the information which is obtained at the step S133 (S134), and thereby it determines whether information to be reported to the user exists (S135). If so, the main CPU 101 displays it by projection or LED (S136), and then finishes the steps. The analysis at step S134 may be the same as that of step S104 in FIG. 11.

In the steps described above, as well as the case where the network CPU 103 performs the steps, if the configuration or state of communication is changed while if cannot be displayed, the user can recognize the state or setting changed soon after it becomes available on the display.

With that, the description about embodiments of the invention is ended. In the invention, a specific arrangement of each part, an operation, a communication protocol used and information displayed are not limited by the description. For example, in the embodiment stated above, current information about a state of communication or a configuration of the projector 100 is displayed at the steps in FIG. 11 and FIG. 15. However, the information about a state of communication or a configuration at the time when the power supply to main CPU 101 was turned off and the state transitioned to a stand-by state may be stored in a recording medium on shut-down procedure. When the state becomes "on", it may be compared with the information obtained from the network sub CPU 104, and if they are not identical (i.e. they are changed), the user may be notified of the information.

Mere existence of the change may be reported by a simple display devise such as an LED. Confirming the change, a user can investigate the cause if needed. Or when the information about a configuration or a state of communication is not changed, it may be less necessary to report it. Therefore, by adopting the aforementioned method, the notification may be effectively done depending on the situation.

In FIG. 5 and FIG. 6, when the state transitions from "off" to "stand-by B" or "Stand-B C", the sub CPU 102 directs the network CPU 103 to turn on the power, and then the network sub CPU 104 directs to turn it off. However, in that case, the sub CPU 102 may not direct the network CPU 103 to turn on the power while the network sub CPU 104 may not direct to change the power supply state (i.e. "off" state of the power supply is kept).

In addition to the projector 100, this invention may be applied to any communication device which communicates with an external device via a network.

Figure 17:
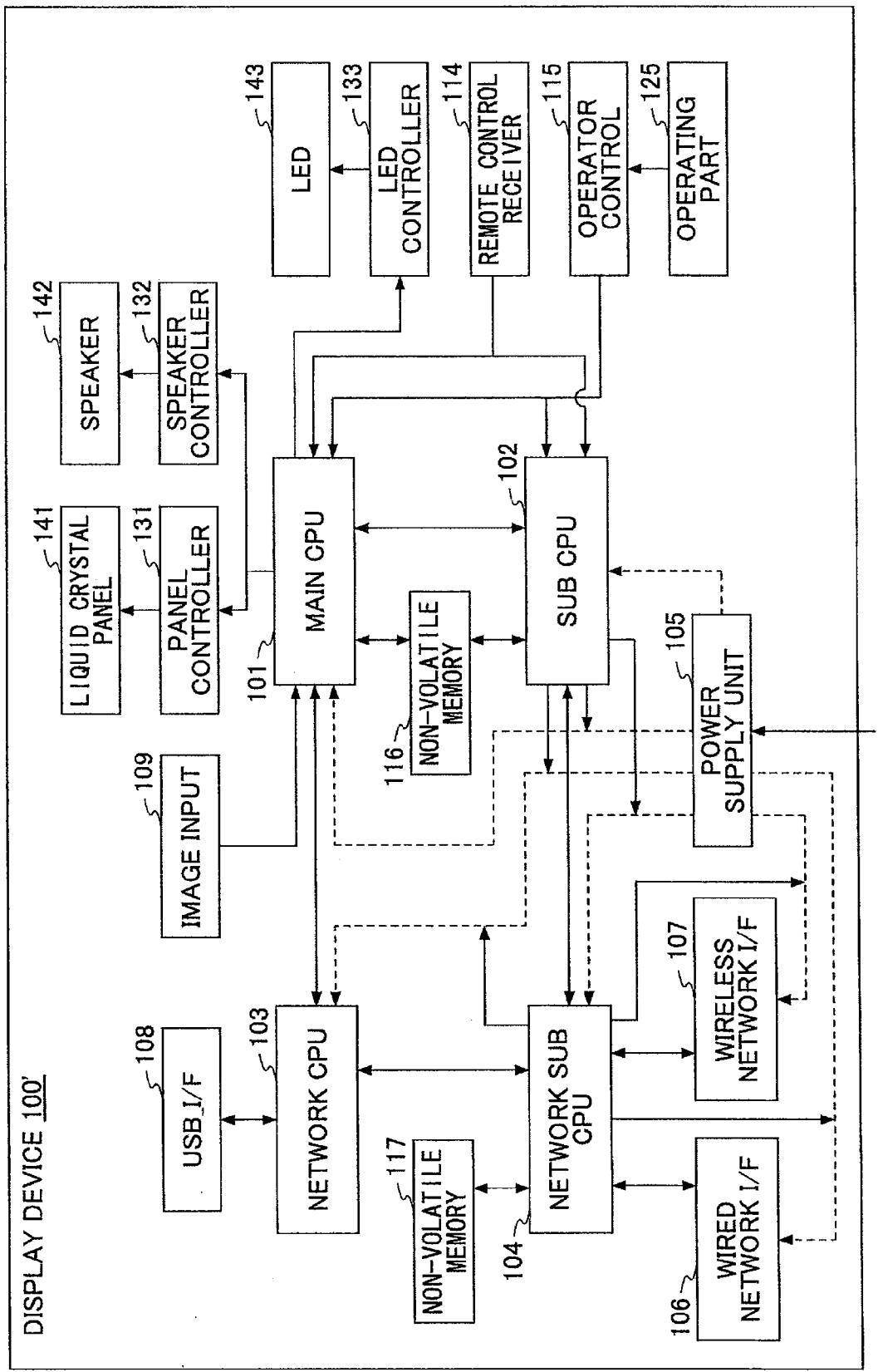
FIG. 17 is a hardware configuration of a display unit according to an embodiment of a communication device of the invention.

For example, it can be applied to a display device 100' in FIG. 17. The display device 100' comprises a liquid crystal panel 141, a speaker 142, and a LED 143; and a panel controller 131, a speaker controller 132 and a LED controller 133 corresponding to them in place of the fan 120, the lamp 121, the DMD 122, the display 123 and the controllers of the projector 100. The display device 100' can use criteria in FIG. 18 for the determination at steps S101 and S131 in FIG. 11 and FIG. 15

Furthermore, this invention may be applied to network-enabled consumer electronics, vending machines, medical devices, electric power units, air intake systems, measuring systems for gas, water or electric service, cars, aircraft or communication devices of general purpose computers.

The program according to the invention causes each of the CPUs in the aforementioned communication device to realize the function. The program is performed by a computer to achieve effects as described above. Such program may be stored in ROM arranged in a computer in advance or a recording medium such as a CD-ROM, flexible or the like disk or a non-volatile storage medium (memory) such as NVRAM, EEPROM, memory card or the like. The stored program in the memory may be installed into a computer and executed by a CPU to perform the steps as stated above.

Alternatively the program can be downloaded from a network-connected external device comprising a record medium which stores the program or storing the program in a recording device. It will be appreciated that constitution of the embodiments, examples and alternatives can be arbitrarily combined and practiced unless they conflict.

Further, the present invention is not limited to these embodiments, but various variations and modifications may be made without departing from the scope of the present invention.

The present application is based on Japanese Priority Application No. 2012-209242 filed on Sep. 24, 2012 and No. 2012-002346 on Jan. 10, 2012 with the Japanese Patent Office, the entire contents of which are hereby incorporated by reference.

What is claimed is:

1. A communication device, comprising:
a main controller configured to receive and process image data;
a first network controller configured to convert data input from an external device into the image data and provide the main controller with the image data;
a sub controller configured to detect a power-on command; and
a second network controller configured to control communication with the external device via a network to provide the first network controller with the data input from the external device, wherein power supplies to the main controller, the sub controller, the first network controller, and the second network controller are independently controlled, and wherein the main controller includes:
an information manager configured to manage activity log and configuration information of the communication device; and
a recorder configured to cause the second network controller to record at least part of the activity log and the configuration information.

2. The communication device as claimed in claim 1, wherein the second network controller includes a supply controller configured to control power supply to the first network controller.

3. The communication device as claimed in claim 2, wherein the supply controller is configured to turn off the power supply to the first network controller when no data input from the external device via the network has been detected for a predetermined time period.

4. The communication device as claimed in claim 3, wherein the supply controller is configured to turn on the power supply to the first network controller upon detecting the data input that is to be converted into the image data and that is supplied from the external device via the network.

5. The communication device as claimed in claim 2, wherein the supply controller is configured to turn off the power supply to the first network controller when an interface, which accepts a direction of whether communication with the external device is used via the second network controller, accepts the direction that the communication is not used.

6. The communication device as claimed in claim 2, further comprising a connection detector configured to detect connection of a storage medium to the communication device, wherein
the supply controller is further configured to:
control power supply to the main controller; and
turn on the power supplies to the first network controller and the main controller when the connection detector detects the connection of the storage medium.

7. The communication device as claimed in claim 1, further comprising a plurality of communication interfaces configured to communicate with the external device via the network, wherein
the second network controller includes a supply controller configured to control power supply to each of the plurality of communication interfaces, and
the supply controller turns off power supply to a communication interface which is not used for communication in response to a selection which is accepted by a third interface, where the third interface is configured to accept a selection of a communication interface which is used for communication.

8. The communication device as claimed in claim 1, further comprising a notifier configured to, when power supply to the first network controller is turned on, obtain information about a state of communication with the external device or a configuration for communication with the external device from the second network controller and perform notification of all or part of the information externally.

9. The communication device as claimed in claim 1, further comprising a memory configured to store information about a state of communication with the external device or a configuration for communication with the external device as it exists in the second network controller at a time a power supply to the first network controller is turned off, wherein the first network controller has a notifier configured to, when the power supply to the first network controller is turned on, determine whether the information about the state of communication with the external device or the configuration for communication with the external device as it exists in the second network controller is different from information stored in the memory, and when the information is different, report a difference externally.

10. The communication device as claimed in claim 8, wherein
the first network controller causes the main controller to perform the notification, and
the first network controller refrains from obtaining the information about the state of communication with the external device or the configuration for communication with the external device from the second network controller when the power supply to the first network controller is turned on but a power supply to the main controller is turned off.

11. The communication device as claimed in claim 8, wherein
the first network controller refrains from obtaining the information about the state of communication with the external device or the configuration for communication with the external device from the second network controller when the power supply to the first network controller is turned on but a power supply to the second network controller is turned off.

12. The communication device as claimed in claim 8, further comprising a plurality of communication interfaces configured to communicate with the external device via the network, wherein
the second network controller has a supply controller configured to control power supply to each of the plurality of communication interfaces, and
when the first network controller obtains the information about the state of communication with the external device or the configuration for communication with the external device from the second network controller, the first network controller obtains information relating to a communication interface of the plurality of communication interfaces whose power supply is turned on.

13. The communication device as claimed in claim 1, further comprising a notifier configured to, when a power supply to the main controller is turned on, obtain information about a state of communication with the external device or a configuration for communication with the external device from the second network controller and report all or part of the information.

14. The communication device as claimed in claim 1, further including a memory configured to store information about a state of communication with the external device or a configuration for communication with the external device as it exists in the second network controller at a time a power supply to the main controller is turned off, wherein
the main controller has a notifier configured to, when the power supply to the main controller is turned on, determine whether the information about the state of communication with the external device or the configuration for communication with the external device as it exists in the second network controller is different from information stored in the memory, and when the information is different, report a difference externally.

15. A control method for a communication device comprising a main controller configured to receive and process image data, a first network controller configured to convert data input from an external device into the image data and provide the main controller with the image data, a sub controller configured to detect a power-on command, and a second network controller configured to control communication with the external device via a network to provide the first network controller with the data input from the external device, wherein power supplies to the main controller, the sub controller, the first network controller, and the second network controller are independently controlled, the control method including:
- obtaining information about a state of communication with the external device or a configuration for communication with the external device from the second network controller when power supply to the first network controller or the main controller is turned on;
- reporting all or part of the information to a user;
- managing activity log and configuration information of the communication device; and
- causing the second network controller to record at least part of the activity log and the configuration information.

16. A non-transitory computer-readable storage medium for storing a program therein, the program causing a communication device, which includes a main controller configured to receive and process image data, a first network controller configured to convert data input from an external device into the image data and provide the main controller with the image data, a sub controller configured to detect a power-on command, and a second network controller configured to control communication with the external device via a network to provide the first network controller with the data input from the external device, wherein power supplies to the main controller, the sub controller, the first network controller, and the second network controller are independently controlled, to execute a control method, the method comprising:
- obtaining information about a state of communication with the external device or a configuration for communication with the external device from the second network controller when power supply to the first network controller or the main controller is turned on;
- reporting all or part of the information to a user;
- managing activity log and configuration information of the communication device; and
- causing the second network controller to record at least part of the activity log and the configuration information.

17. The communication device as claimed in claim 7, wherein each the plurality of communication interfaces includes one of a wired interface and a wireless interface.

18. The communication device as claimed in claim 7, wherein the supply controller is configured to control the power supply to each of the plurality of communication interfaces based on an interface setting for use of communication.

19. The communication device as claimed in claim 1, wherein the configuration information of the communication device includes at least one of an energy saving setting, a power-on setting, interface settings for use of communications, a Dynamic Host Configuration Protocol (DHCP) server setting for network communications, and a gateway address setting.

* * * * *